United States Patent [19]
Hawkins

[11] 3,829,825
[45] Aug. 13, 1974

[54] TENSION CONNECTOR ASSEMBLY FOR CABLE AND THE LIKE

[75] Inventor: Ronald G. Hawkins, Jefferson, Tex.

[73] Assignee: Aluminum Company of America, Pittsburgh, Pa.

[22] Filed: Feb. 8, 1971

[21] Appl. No.: 113,428

[52] U.S. Cl............. 339/242, 339/277 U, 339/248, 24/135 N, 24/115 R, 403/209, 403/236
[51] Int. Cl...................... H01r 13/12, F16g 11/06
[58] Field of Search ......... 24/68 R, 263 DB, 125 N, 24/135 N, 115 G, 87 CC, 278, 134 E, 132 AB, 68 CT, 71.1; 339/272 U, 265 R, 269 U, 263, 272, 242; 174/84 S, 94 S; 287/118; 269/153; 248/62, 63, 74 R, 230, 226 B, 125; 403/206, 209, 236; 254/67

[56] References Cited
UNITED STATES PATENTS

| | | | |
|---|---|---|---|
| 1,529,279 | 3/1925 | St. John | 339/234 |
| 1,725,748 | 8/1929 | Alexander | 24/115 G |
| 2,086,710 | 7/1937 | Fotsch | 24/125 N |
| 2,112,053 | 3/1938 | Thomas | 339/249 A |
| 2,621,384 | 12/1952 | Slaughter | 24/81 CC |
| 2,634,471 | 4/1953 | Lacher | 24/71.1 |
| 3,129,996 | 4/1964 | Locher | 24/125 N |

FOREIGN PATENTS OR APPLICATIONS

| | | | |
|---|---|---|---|
| 35,751 | 12/1966 | Finland | 339/267 |
| 60,130 | 9/1942 | Denmark | 24/135 N |
| 419,275 | 2/1967 | Switzerland | 339/272 US |
| 500,060 | 2/1939 | Great Britain | 248/230 |

*Primary Examiner*—Bernard A. Gelak

[57] ABSTRACT

Tension connector assembly for cable and the like including a base spring member and a keeper spring member in opposed facing relation, each member having legs extending toward the other member and corresponding cable engaging seats defined across the legs of such member and facing the same such member, the opposing legs of the members being correspondingly offset to permit relative movement of the members toward and away from each other and corresponding overlapping alignment of the base seats and keeper seats in opposed facing relation for cooperative opposed seating engagement of the corresponding seats with a portion of a cable insertable thereacross to interconnect thereby the legs of base member with the legs of the keeper member, and adjustable tension exerting means interposed operatively between the members to urge them away from each other and in turn the opposed seats under tension against the correspondingly opposed portions of the girth of the cable adjacent thereto.

28 Claims, 27 Drawing Figures

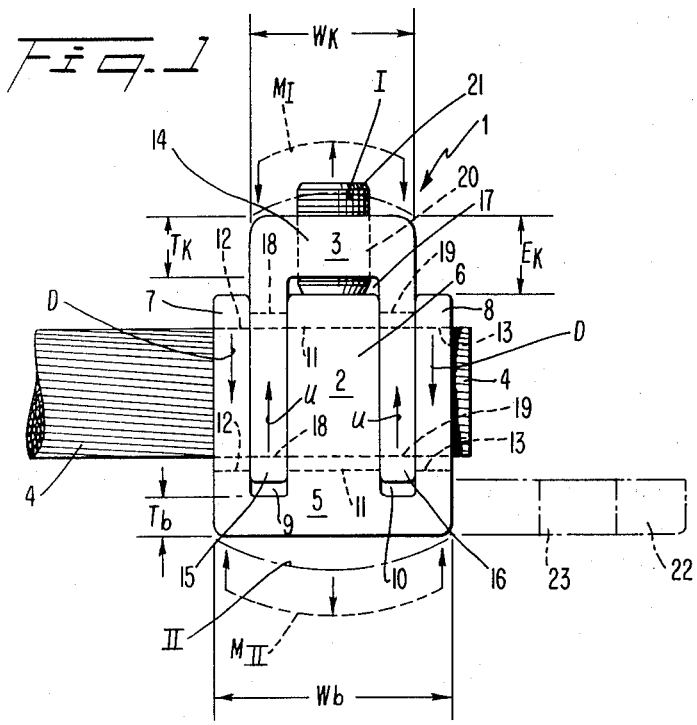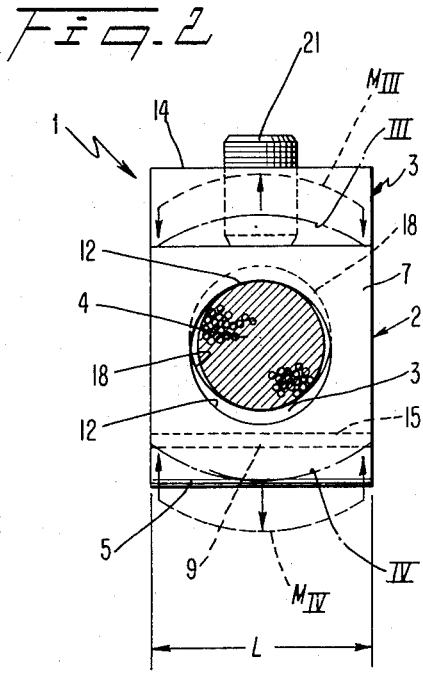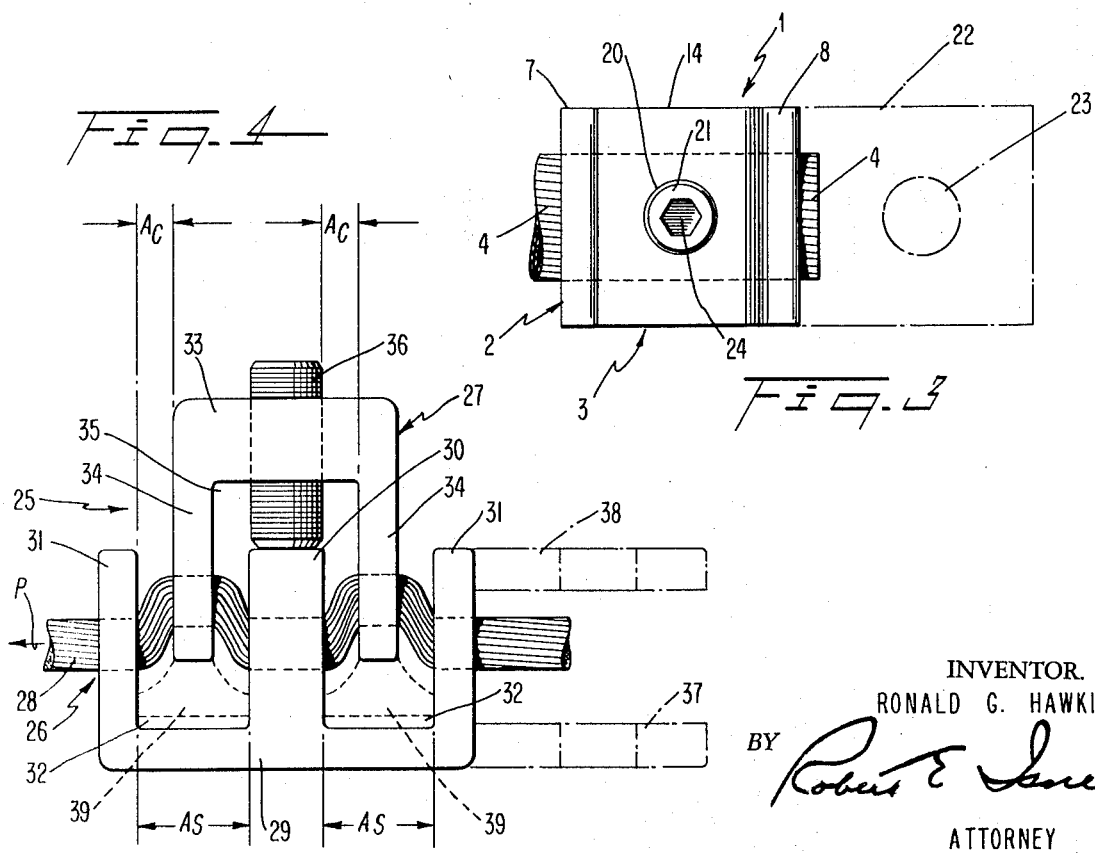
INVENTOR.
RONALD G. HAWKINS
BY
ATTORNEY

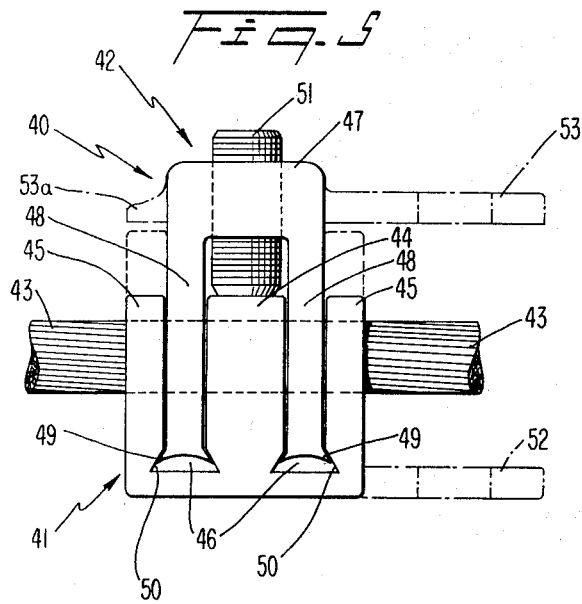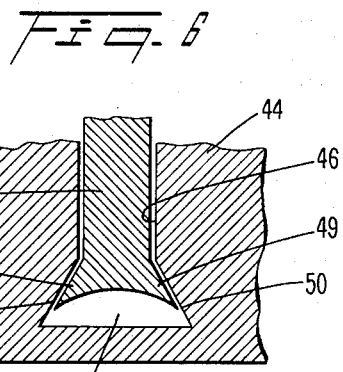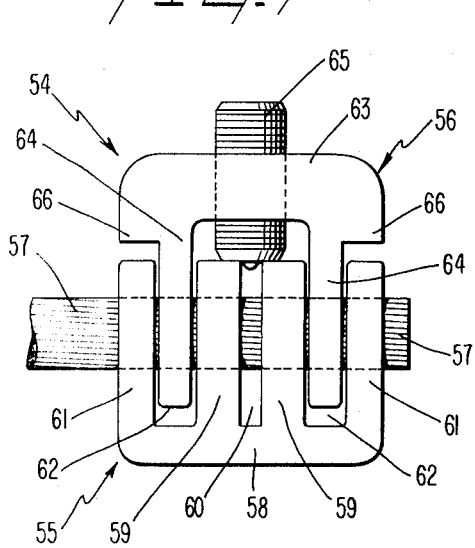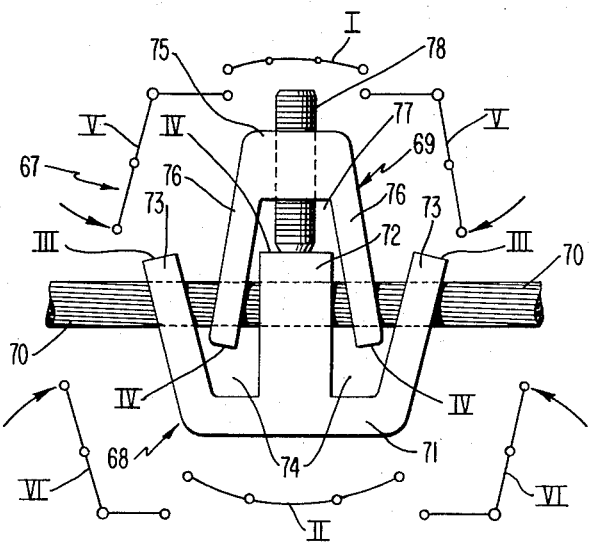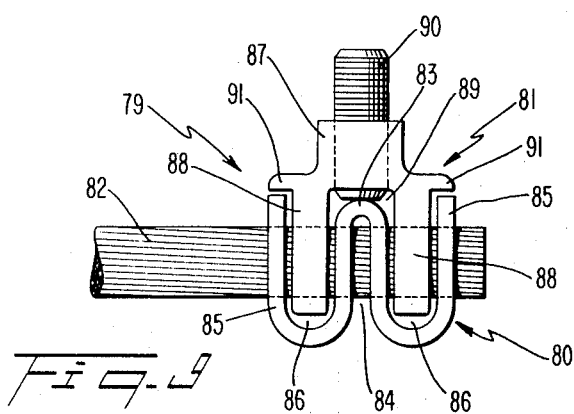

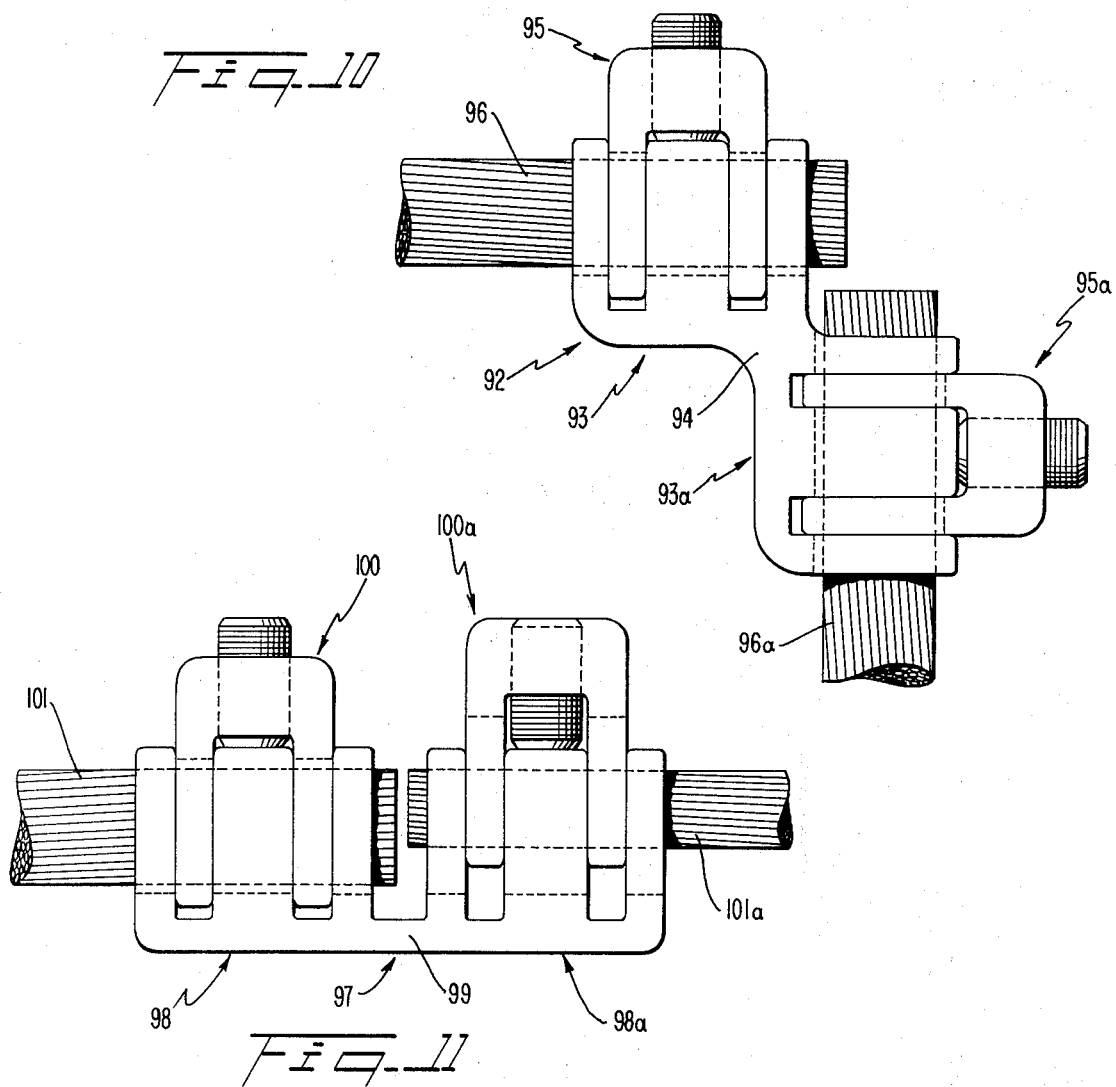

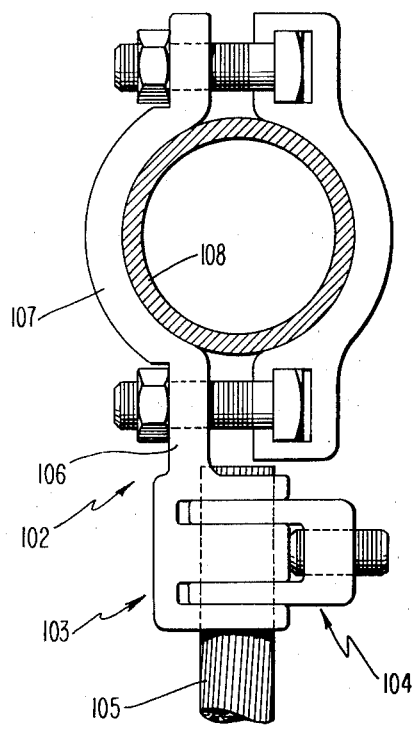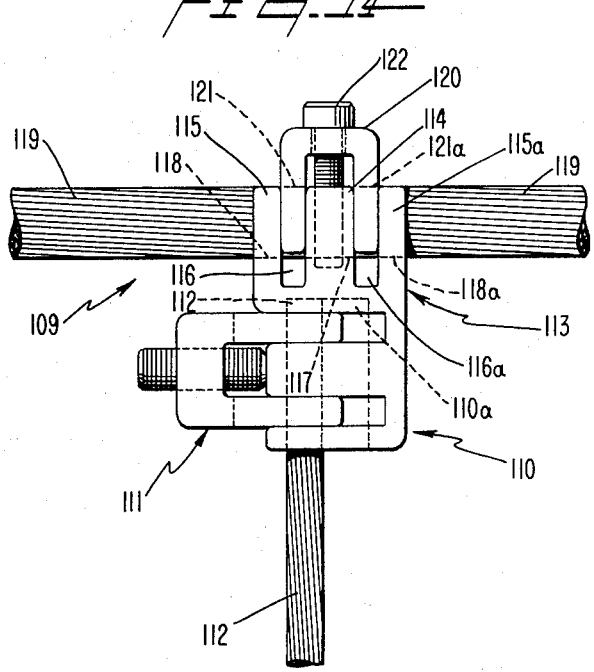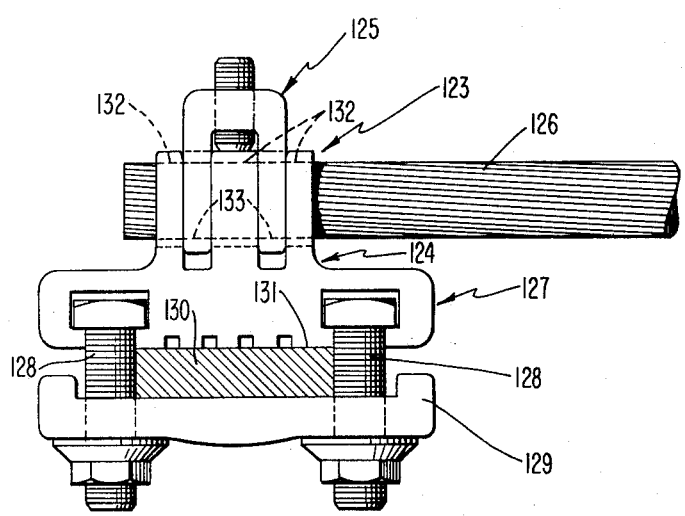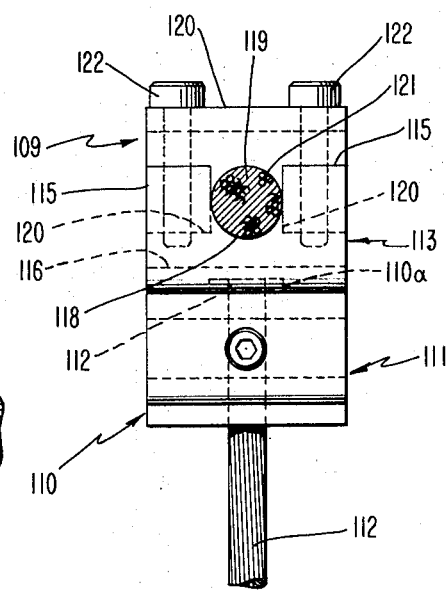

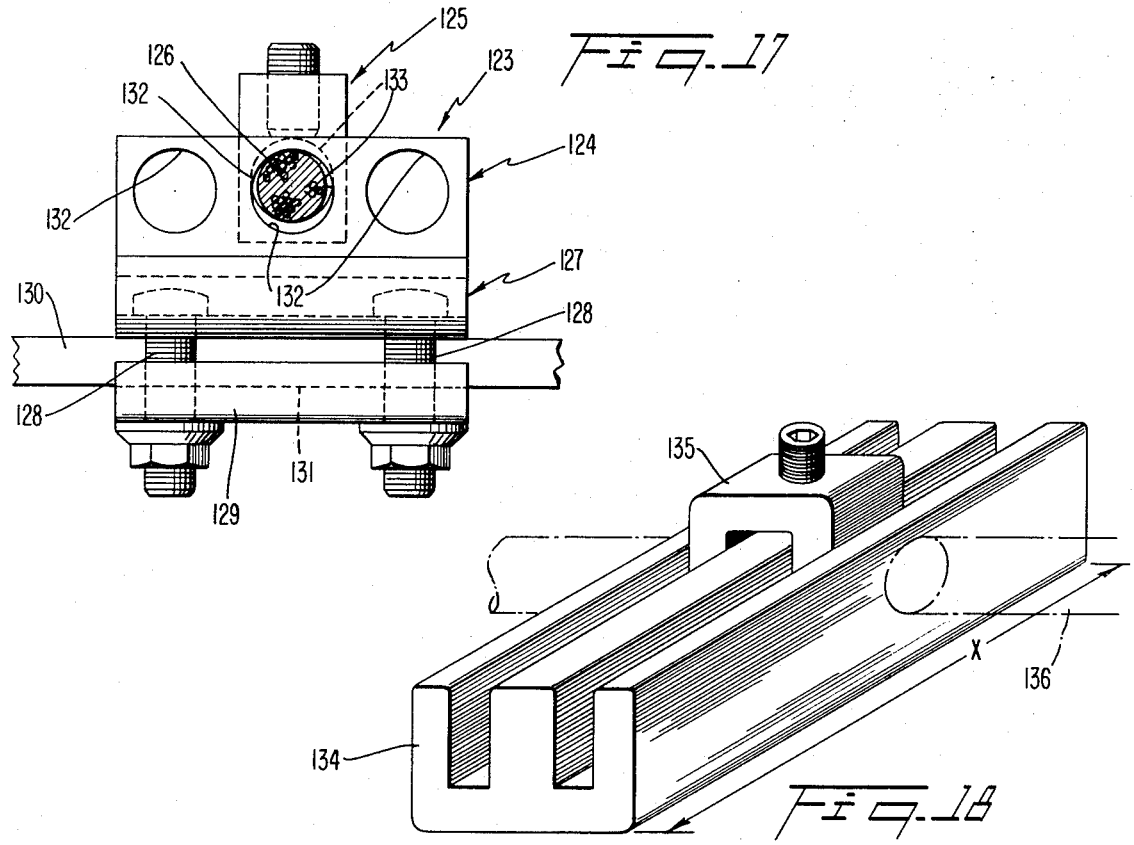
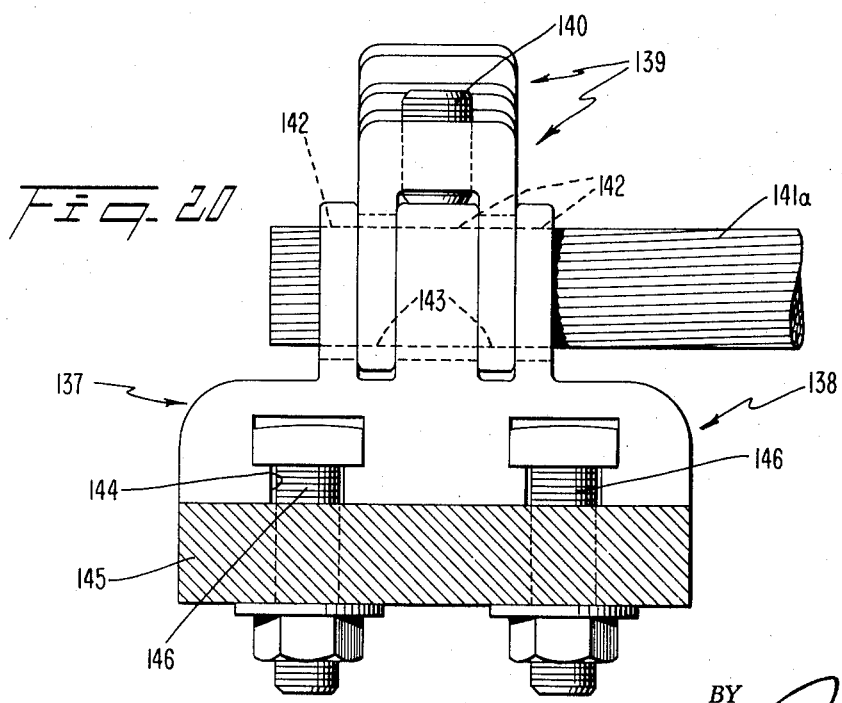

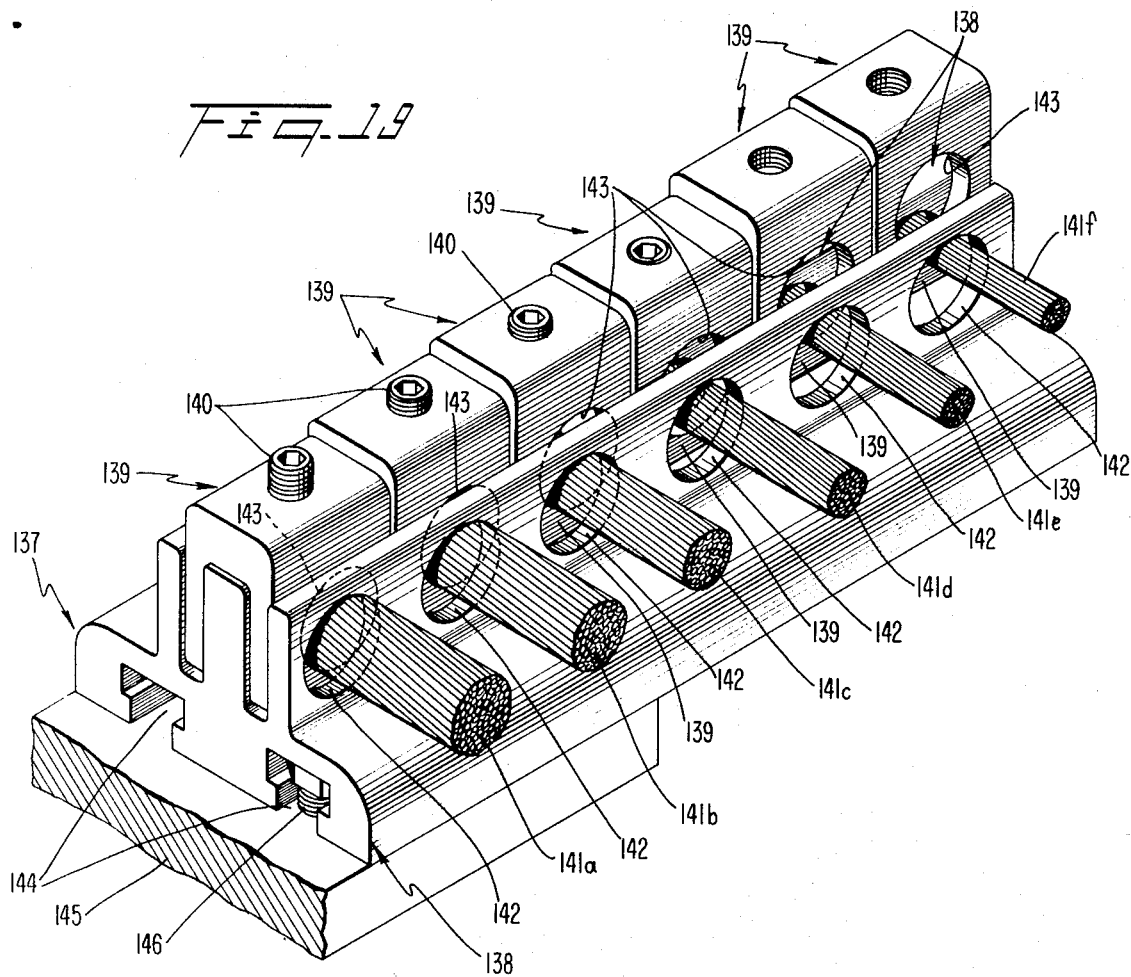
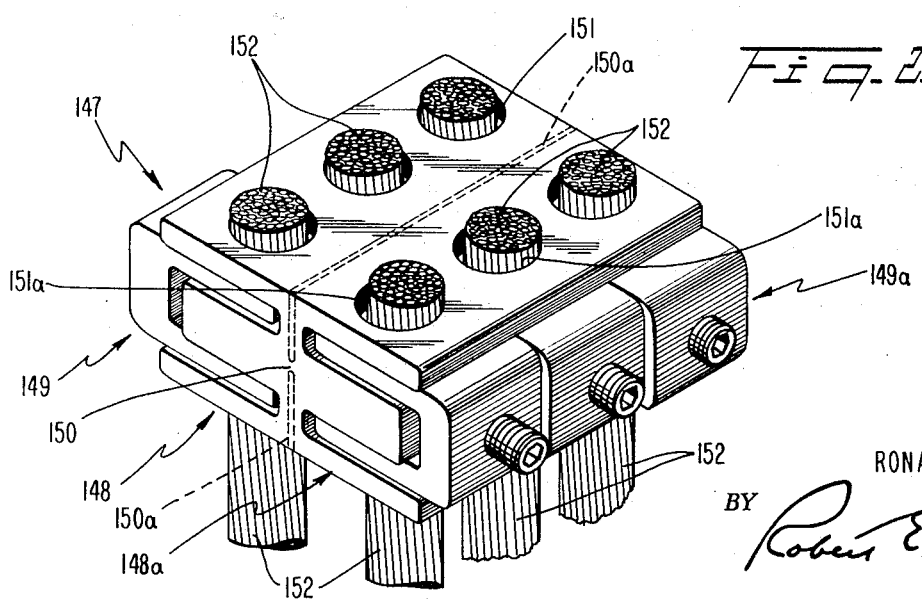

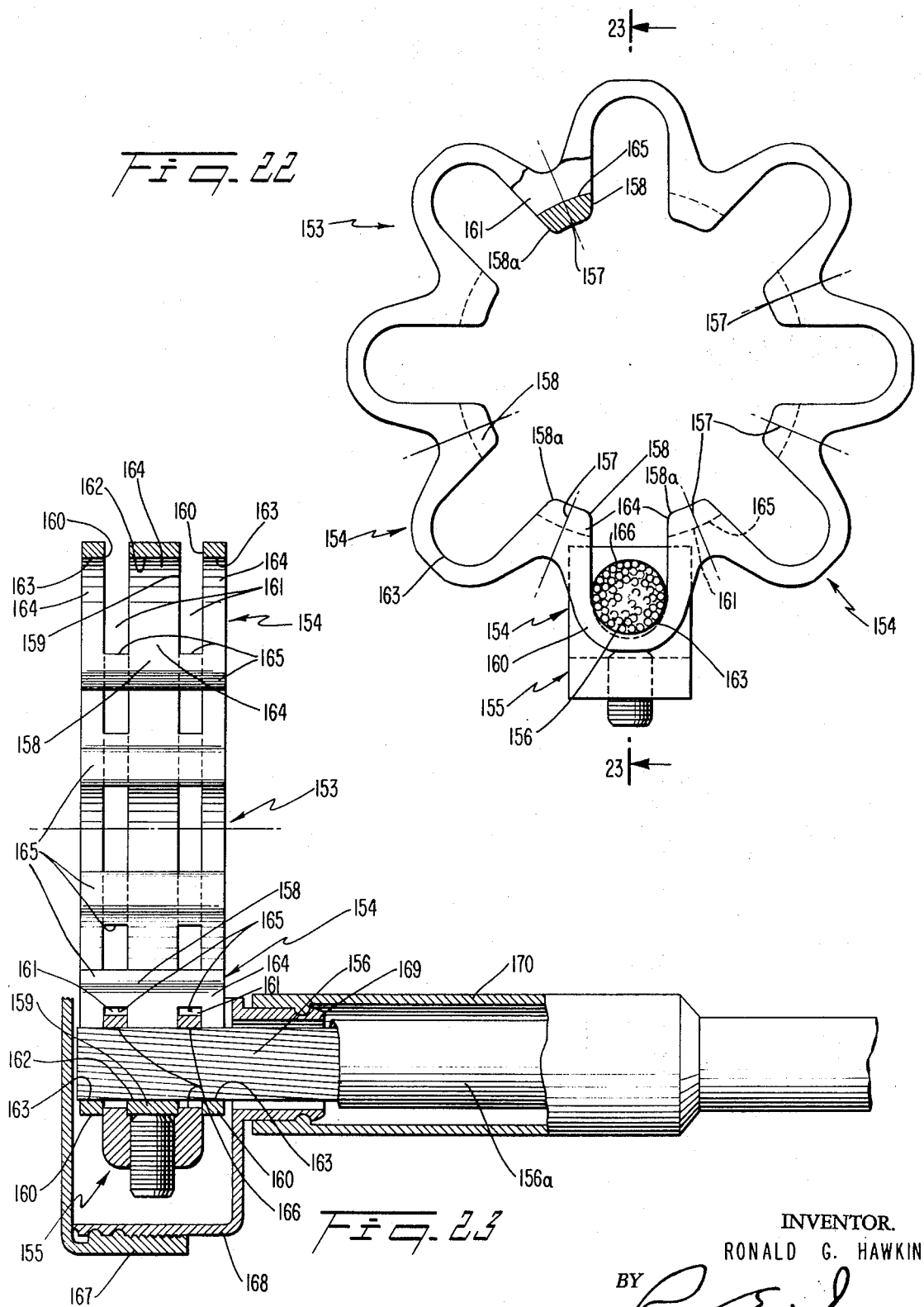

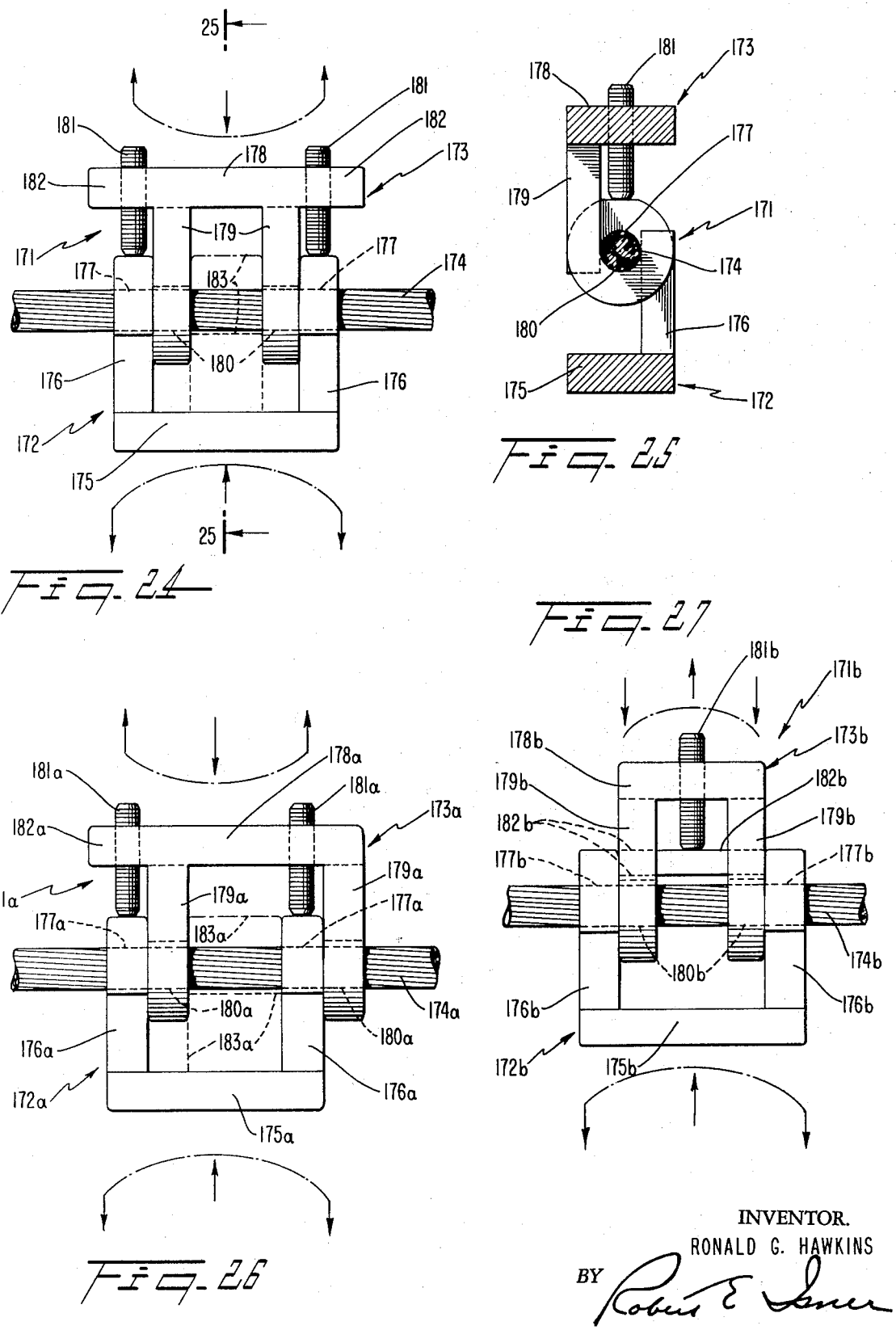

TENSION CONNECTOR ASSEMBLY FOR CABLE AND THE LIKE

The present invention relates to a tension connector for cable and the like, and more particularly to a tension connector assembly including a base and a keeper, each having legs extending toward the other an containing cable engaging seats, the opposed legs being correspondingly offset to permit movement of the base and keeper toward and away from each other and cooperative engagement of the correspondingly opposed seats with a cable insertable thereacross to interconnect thereby the legs of the base with the legs of the keeper, and adjustable tension exerting means for urging the base and keepers away from each other and in turn the opposed seats under tension against the corresponding opposed portions of the girth of the cable adjacent thereto.

Conventional cable or wire connectors are generally provided in the form of bolt or screw operated compression clamps or tension clamps in order to maintain as constant a clamping pressure on the cable or wire as possible. Compression clamps operate to engage the cable or wire under compression load, e.g. employing compression spring action, whereas tension clamps operate to engage the cable or wire under tension load, e.g., involving tension spring action.

Spring action is desirably incorporated into these bolt or screw operated connectors or clamps in an attempt to offset the degradation of clamping action occasioned by expansion and contraction of the clamping parts which accompany changes in temperature. This is especially true in the case of electrically conductive cable connectors where the rate of expansion and contraction of the cable differs from that of the clamping parts. However, those connectors heretofore provided were either cumbersome in design and construction, expensive to manufacture, impractical in use, or inherently unable to offset to an acceptable extent the disadvantageous results of expansion and contraction of the operative connector parts. Furthermore, those conventional connectors which did employ spring action were limited essentially only to unilateral spring action.

It is an object of the present invention to overcome disadvantages previously encountered and to provide a tension connector assembly for cable and the like which effectively maintains substantially constant clamping pressure on the corresponding cable, regardless of temperature changes and concomitant expansion and contraction of the clamping parts and/or cable, even where the clamping parts and/or cable have different rates of expansion and contraction.

It is another object of the invention to provide a tension connector assembly of the foregoing type employing opposed clamping parts which may be maintained against an interposed cable and the like under correspondingly opposed tension spring urgence to supply at least bilateral, and preferably multilateral, tension spring clamping action, especially to offset such expansion and contraction of the clamping parts and/or It is still another object of the invention to provide a tension connector assembly of the foregoing type which facilitates the dissipation of any heat generated in the system and/or which maintains positive interface contact between the clamping parts, especially where the cable to be connected is an electrical cable, and an electrical connection is desired.

It is a further object of the invention to provide such an assembly which may be used effectively in any selective spatial orientation, and/or which maintains the clamping parts in captive interassembly.

It is a still further object of the invention to provide such an assembly which enables the cable to be interwoven therethrough to prevent dislodgement of the clamped cable when axial stress is placed thereon, and/or which serves to shear by compression rupture the surface oxidation of individual cable wires, or the peripheral cable insulation, of an electrically conductive cable at the points of clamping contact to achieve metal to metal contact between the cable and the clamping parts of the assembly.

It is a still further object of the invention to provide such an assembly which is mechanically and/or electrically interconnected with one or more additional connector assemblies of the same or different types for mechanical and/or electrical connection thereat of a corresponding number of cables of the same or different diameters.

It is a still further object of the invention to provide one of the clamping parts of the intended assembly in the form of a longitudinal member, preferably in the form of an extruded bar, of selective length having a selective number of tandem arranged cable engaging clamp seats for clamping a corresponding number of individual cables of the same different diameters in cooperation with a corresponding selective number of individual coacting clamping parts, also preferably of extruded stock.

It is a still further object of the invention to provide such clamping parts and/or assembly which may be readily fabricated, or prefabricated, e.g. in extruded form, for ultimate assembly at the end point of use, which are of simple and inexpensive, yet durable, construction, and which permit repeated and sustained multi-functional tension spring action to be effected over their extensive useful life.

Other and further objects of the invention will become apparent from a study of the within specification and accompanying drawings, in which:

FIG. 1 is a schematic elevational view of a tension connector assembly according to one embodiment of the invention, FIGS. 2 and 3 are schematic side and top views, respectively, of the embodiment of FIG. 1, FIG. 4 is a schematic elevational view of a modified assembly similar to that of FIG. 1, FIGS. 5 and 6 are schematic elevational and sectional partial views, respectively, of a further modified assembly in which the clamping parts are captively interconnected, FIG. 7 is a schematic elevational view of a bifurcated leg modified assembly according to another emobdiment of the invention, FIG. 8 is a schematic elevational view of a multi-functional tension spring embodiment of the invention, FIG. 9 is a schematic elevational view of another bifurcated leg modified assembly according to another embodiment of the invention, FIG. 10 is a schematic elevational view of a pair of connector assemblies in the form of an elbow arrangement, FIGS. 11 and 12 are schematic elevational and top views respectively of a pair of connector assemblies in the form of an end to end arrangement, FIG. 13 is a schematic elevational view of a combined T arrangement of an assembly of the invention and a tubular cable clamp, FIGS. 14 and 15 are schematic elevational and top views respectively of another combined T arrangement of an assembly of the invention and a continuous cable clamp, FIGS. 16 and 17 are schematic elevational and side views respectively of still another combined T arrangement of an assembly of the invention and a bar clamp, FIG. 18 is a schematic perspective view of another assembly of the invention in which one of the clamping parts is in the form of an elongated bar adapted to coact with a plurality of cooperating clamping parts for connecting a number of individual cables, FIGS. 19 and 20 are schematic perspective and side views of another assembly of the invention similar to that of FIG. 18, for connecting a number of individual cables, FIG. 21 is a schematic perspective view of a further composite assembly for connecting a number of individual cables, FIGS. 22 and 23 are schematic side and elevational views partially in section, respectively, of a still further composite assembly in the form of a circular arrangement for connecting a number of individual cables, FIGS. 24 and 25 are schematic elevational and partial sectional side views respectively of a further alternate form of the assembly of the invention, and FIGS. 26 and 27 are schematic elevational views of still further alternate forms, respectively, of the invention.

Broadly, the present invention is directed to a tension connector assembly including a base member and a keeper member in opposed facing relation, each member having legs extending toward the other member and corresponding cable engaging seats defined across the legs of such member and facing the same such member, the opposing legs of the members being correspondingly offset to permit relative movement of the members toward and away from each other and corresponding, at least partial, overlapping alignment of the base seats and keeper seats in opposed facing relation for cooperative opposed seating engagement of the corresponding seats with a portion of a cable insertable thereacross to interconnect thereby the legs of the base member with the legs of the keeper member, and adjustable tension exerting means interposed operatively between the members to urge such members away from each other and in turn the opposed seats under tension against the correspondingly opposed portions of the girth of the cable adjacent thereto.

More particularly, the assembly comprises a base spring member and a keeper spring member in opposed facing relation, at least two legs extending from the base member the keeper member and having corresponding cable engaging seats defined thereacross and facing the base member, two legs extending from the keeper member toward the base member in opposing adjacency to the at least two base member legs and having corresponding cable engaging seats defined thereacross and facing the keeper member, the opposing legs of the base and keeper members being correspondingly offset to permit relative movement of the members toward and away from each other and corresponding overlapping alignment of the base seats and keeper seats in opposed facing relation for cooperative opposed seating engagement of the corresponding seats with a portion of a cable insertable thereacross to interconnect thereby the legs of the base member with the legs of the keeper member, and adjustable tension exerting means interposed operatively between the base and keeper members to urge the members away from each other and in turn to engage the base seats against the portion of the cable girth which is remote from the base member and to engage the keeper seats against the opposed portion of the cable girth which is remote from the keeper member under the corresponding spring tension of the base and keeper members.

Preferably, the base member legs are in laterally spaced apart substantial alignment and the keeper member legs are also in laterally spaced apart substantial alignment in laterally offset overlapping adjacency to the corresponding base member legs. In the same way, the base seats are substantially aligned across the base legs and the keeper seats are substantially aligned across the keeper legs. Furthermore, the adjustable tension exerting means in particular are in the form of screw means operatively mounted in one of the members for urging contact against the other of the members.

Referring to the drawing, and initially FIGS. 1 to 3, a tension connector assembly 1 is shown including a base in the form of a base spring member 2 and a keeper in the form of a keeper spring member 3 in opposed facing relation which act as clamping parts for clampingly engaging a cable 4 or the like. The base spring member and keeper spring member coact under bilateral or opposed spring tension when disposed in such facing relation. Base spring member 2 preferably includes a spring yoke 5 remote from the keeper member and having a central screw abutting leg 6 and a pair of outer legs 7 and 8 extending from the base member toward the keeper member, with the outer legs 7 and 8 arranged to define with the central leg 6 two corresponding base outer slots 9 and 10. The keeper spring member 3 includes a spring bridge 14 remote from the base member and laterally interconnecting a pair of keeper legs 15 and 16 extending from the keeper member toward the base member in opposing adjacency to the base member legs. A keeper slot 17 is defined between the keeper legs 15 and 16.

Central leg 6 and the base outer legs 7 and 8 correspondingly contain the, preferably substantially aligned, cable engaging seats 11, 12 and 13 defined thereacross and facing the base member. On the other hand, the keeper legs 15 and 16 are provided with corresponding, preferably substantially aligned, cable engaging seats 18 and 19 defined thereacross and facing the keeper member.

The opposing legs of the base member 2 and the keeper member 3 are correspondingly offset to permit relative movement of the members toward and away from each other and corresponding, at least partial, operative overlapping alignment of the base seats 11, 12 and 13 and the keeper seats 18 and 19 in opposed facing relation with respect to each other for cooperative opposed seating engagement of the corresponding seats with the portion of the cable 4 inserted thereacross and in effect interconnecting thereby the legs 6, 7 and 8 of the base member with the legs 15 and 16 of the keeper member.

In order to achieve the necessary tension connection clamping pressure contact of the clamping parts 2 and 3 with the cable 4o or the like, adjustable tension exerting means are provided, here in the form of the keeper screw or bolt 21, serving as a set screw, mounted operatively in the threaded bridge bore 20 of the keeper member 3 so as to project into the keeper slot 17. In the opposed arrangement, the keeper screw 21 is thus interposed operatively between the base member 2 and the keeper member 3 and in a plane substantially passing through the base seats and keeper seats to urge these members away from each other and in urn to engage the base seats 11, 12 and 13 against the portion of the cable girth which is remote from the base member 2 and to engage the keeper seats 18 and 19 against the opposed, i.e. diametrically opposed, portion of the cable girth which is remote from the keeper member 3 (see FIG. 2), under the corresponding spring tension of the base and keeper members which are subjected to the urging force of the keeper screw 21 therebetween.

It is preferred that the base member legs be in laterally spaced apart substantial alignment and also that the keeper member legs be similarly in laterally spaced apart substantial alignment and in laterally offset overlapping adjacency to the corresponding base member legs, with the base seats 11, 12 and 13 substantially aligned across the base legs and the keeper seats 18 and 19 substantially aligned along the keeper legs. In this way, the cable 4 or the like may be simply inserted through the cable engaging seats and the keeper screw 21 rotatably mounted in the spring bridge 14 then displaced in urging contact with the base central leg 6 adjacent thereto.

As may be appreciated from FIG. 2, the base seats 11, 12 and 13 as well as the keeper seats 18 and 19 are shown in the form of corresponding seat apertures of substantially circular or round cross-section defined laterally through the respective legs, i.e. transversely through the overlapping aligned legs in accord with the axial disposition of the cable 4 or the like to be connected thereat. However, the corresponding base and keeper seats need not necessarily take the form of such closed seat apertures, and thus may even be provided in the form of unilaterally open ended slot apertures (cf. FIGS. 22 and 23), with any of such seats or apertures being of selective cross-sectional shape so long as a corresponding cable engaging seat portion is defined laterally across each leg and faces the same member from which such leg outwardly extends. In fact, the seats in question can even be provided as leg hooks disposed on the corresponding free ends of the respective legs, with the individual open portion of the hook in each instance facing the member carrying such hook (see FIGS. 24 and 25).

Optional mounting means 22 having a suitable mounting aperture 23 or the like (as shown in phantom) may be provided on one of the members to mount the assembly on a support surface. This type of mounting may be used where the assembly is to serve as a dead end connector, i.e. where an end of the cable 4 is inserted through the seat apertures of the coacting clamping parts 2 and 3 and placed under substantially constant clamping pressure in terms of the urging of keeper screw 21 against the adjacent face of the central screw abutting leg 6.

As noted in FIG. 3, keeper screw 21 may be provided with a hexagonal recess 24 into which a wrench or similar tool may be inserted to rotate keeper screw 21 for achieving the desired tension clamping engagement of the cable 4 between the clamping parts 2 and 3.

Because of the use of at least two legs in each of the opposed members, at least a double spring action is provided in the instant construction. This bilateral or multi-functional tension spring action is an inherent feature of the present invention. As the keeper screw 21 engages the central screw abutting leg 6, when the cable 4 is inserted along the base and keeper seats, the base member 2 is urged downwardly in the direction of arrows D and the keeper member 3 is urged upwardly in the direction of the arrows U (see FIG. 1). The keeper screw 21 is thus placed under a compression load between the adjacent end of the central leg 6 and the area surrounding the threading bridge bore 20, thereby placing spring bridge 14 and spring yoke 5 under opposing spring tension. The base and spring members in this regard will inherently be formed of material having some resilient, elastic or spring characteristic permitting the member to undergo nonpermanent tension deformation. Generally, because of mechanical strength considerations, the clamping parts of the assembly will be formed of metal, and especially extrudable metals such as aluminum and including appropriate alloys of such metals. Nevertheless, because of the inherent opposed tension spring clamping action of the instant assembly, the various parts may even be formed of plastic of suitable strength, in whole or in part, i.e. where the plastic material used has structurally sufficient resiliency permitting nonpermanent tension deformation thereof.

As may be seen from FIG. 1, the keeper member 3 contains the transverse or laterally extending spring I which is subjected to the bending moment $M_I$. On the other hand, the base member 2 contains the transverse or laterally extending spring II which is subjected to the opposed bending moment $M_{II}$. The opposed bending moments are depicted by the corresponding arrows. The effectiveness of the spring action of the base member 2 and the keeper member 3 will be determined to some extent by the transverse or lateral dimensions $W_b$ and $W_k$, respectively, and the thickness dimensions $T_b$ and $T_k$ of the spring yoke 5 and spring bridge 14, as well as the length L (see FIG. 2).

Thus, by appropriately selecting the dimensions $W_b$, $W_k$, $T_b$, $T_k$ and L, the connector assembly can be provided with flexible characteristics permitting lesser or greater spring characteristics to be included.

In addition to the foregoing spring action, as the cable 4 engages the upper or outer sides of the apertures 11, 12 and 13, under the urging force of keeper screw 21, a further spring III having the bending moment $M_{III}$ will occur at the corresponding seat thereacross, i.e. on each of the three base legs 6, 7 and 8 (see FIG. 2). In the same way, the diametrically opposed lower or outer sides of the apertures 18 and 19 in the keeper legs 15 and 16 will be urged against the diametrically opposed portion of cable 4 so that the spring IV having bending moment $M_{IV}$ will also occur at each corresponding seat.

It will be realized that because of the tension spring action provided by springs I and II, supplemented by springs III and IV, under the compression load of keeper screw 21, the system can follow changes in temperature and concomitant expansion and contraction of the two clamping parts 2 and 3 and/or of the cable 4 or the like, without loosening the connection therebetween and without even detracting from the substantially constant pressure clamping action on the cable by the base and keeper members. Advantageously, therefore, the base and keeper members may be made of materials of different inherent rates of expansion and contraction and the same is true of the cable or the like to be connected thereby, since each individual clamping part 2 or 3 is provided with effective spring tension under the compression load on keeper screw 21 so that such part will continually maintain some spring tension clamping engagement with the cable, dispite variations in heating and cooling cycles on the system. The double spring action of the base and keeper members provided by the inherent springs I and II essentially completely eliminates the problem of insufficient or non-constant pressure clamping action between the connector and the cable.

Depending on the diameter of the cable 4 or the like in relation to the dimensions of the various seats or apertures and the corresponding lengths of the legs and slots of the two members, the keeper member 3 will be displaced by keeper screw 21 a given distance away from base member 2 so that an appropriate exposed area $E_k$ will be present along the longitudinal side of the keeper 3. The longitudinal extent of such area is measured by the distance L (see FIG. 2) and the exposed surface area $E_k$ extends along both longitudinal sides of the keeper member 3.

It is clear that the amount of exposed area $E_k$ in terms of the length L of the assembly when taken with the remaining constantly exposed surface area of the system, provides effective surface area for dissipating heat which may be generated, for example, where the cable is an electrically conductive cable. The various legs in the assembly serve as radiant cooling fins and apart from the overlapping relation of the various seats in the various legs, the legs of the base member 2 and/or the keeper member 3 may be provided as extra long legs using a similarly longer keeper screw 21 so as to achieve not only the effective positive constant clamping action under the opposed spring tension of springs I and II but also an increase in the effective exposed surface area for cooling purposes.

It will be seen from FIG. 1 that the two corresponding base outer slots 9 and 10 which displaceably receive the corresponding keeper legs 15 and 16, and also the keeper slot 17 which displaceably receives the base central leg 6, are selectively sized and shaped for laterally adjacent abutting dispostion to provide substantially positive sliding contact between the keeper legs 15 and 16 and the base outer slots 9 and 10 and between the base central leg 6 and the keeper slot 17. This will enhance the electrical connection of the base and keeper parts with one another and provide along the axial length of the cable 4 corresponding to the dimension $W_b$ a composite contact bore permitting electrical contact more or less through the entirety of the system for tapping off, for example, via the mounting means 22. Thus, the base and keeper legs and slots may be selectively sized and shaped not only to determine the extent of the exposed surface $E_k$ and the amount of spring action via the dimensions $W_b$, $W_k$, $T_b$, $T_k$ and L, but also, the degree, if any, of enhanced positive sliding contact electrical interconnection of the co-acting parts.

The cable is shown in FIGS. 1 to 3 as a substantially round cable although such cable may take any desired cross-sectional shape so long as it provides a surface against which the corresponding seats of the base and keeper members can effectively engage for achieving the tension connection of the cable with the clamping parts. The cable may be provided in other than substantially round form, for instance, in the form of a flattened cable strap or even in the form of a cable of elliptical cross-section. The cable may be a monofilament wire or may be a stranded cable having a multiplicity of such wires in the form of strands in the cable, e.g. as helically laid strands in a composite cable. The cable may possess mechanical strength and/or electrical conductivity, each type of cable being readily accommodated by the connector assembly in question. It is clear that both a mechanical and an electrical connection is made with the cable by way of the opposed spring tension clamping parts. Therefore, the assembly may be in the form of an electrical terminal connector or in the form of a mechanical dead end connector, or the like, as desired.

Although the cable engaging base seats and keeper seats are shown in FIG. 2 as closed apertures of substantially circular or round cross-section all of which are of the same general diameter, it will be realized that the diameters of these apertures and their corresponding cross-sectional shapes may vary, one with the other, so long as some degree of operative interalignment of the various transverse seats extending across the adjacent legs is provided. It is preferred that such alignment be sufficient to permit the workman to insert the end of the cable directly through the opposed apertures of the two members in an unhindered manner and thereafter the clamping parts to be urged apart by appropriate rotation of the corresponding keeper screw. Nevertheless, the disposition of the opposed seats on the two members and their ability to be displaced toward and away from one another permits the use of the assembly for connecting cables of considerable difference in diameter. The various dimensions of the base and keeper members can be selected at will to accommodate such widely varying diameter cables while at the same time permitting the multiple spring action to occur as well as any desired degree of radiant cooling in terms of the cooling fin action of the exposed area $E_k$ provided in excess of the normal exposed area of the assembly.

Also, the dimensions of the opposed seats can be selected to permit insertion of two or more cables in friction contact as a bunch across the seats for positive contact clamping engagement therebetween under the spring tension of the members caused by the urgence of the keeper screw.

It will be seen that depending upon the compression load of the keeper screw 21, a shearing action may be exerted radially on the cable by the opposed cable engaging seats, e.g. along the opposing sides of the composite elliptical co-acting aperture configuration of the identical diameter apertures in the embodiment shown in FIG. 2, whereby to cause the various strands or wires along the interior and/or exterior of the cable to follow the elliptical perimeter and rub together and be compressed and/or a layer of insulation on the outer periphery of the cable to be compressed. In the corresponding instance, the surface oxidation layer present on the individual wires or strands, or the insulation layer present on the periphery, of the cable will be ruptured in a substantially radially inward compressive manner. Heretofore, any such rupturing was effected by peripheral rotational cutting action of the clamping surfaces against the cable exterior leading to some marring of the cable. Enhanced electrical connection by surface metal to metal contact is achieved by such compression rupturing according to the invention because the oxidation layers on the individual wires throughout the cable are broken or rubbed through for better electrical contact at each compression line or point and/or because the insulation is readily broken through thereat for electrical contact with the clamping parts without marring the cable itself.

It will be realized that because of the compactness and arrangement of the two connected clamping parts, via the cable which extends therethrough, the assembly may be oriented in any desired spatial disposition, i.e. upright as shown in FIG. 2, or on either side, or even in upside down disposition. The manner of orientation is generally determined by the support surface to which the assembly is to be connected.

FIG. 4 shows a similar arrangement to that of FIGS. 1 to 3 including the assembly 25 having the base spring member 26 and the keeper spring member 27 in opposed facing relation with the cable 28 interwoven therethrough, but in this case the base and keeper legs and slots are selectively sized and shaped to provide interspaces between the corresponding overlapping legs. The base member 26 contains the transversely elongated spring yoke 29 and the central screw abutting leg 30 together with the base outer legs 31, 31 which define the base outer slots 32, 32 therebetween. The base outer legs 31, 31 are spaced widely apart with respect to the central leg 30 to provide the slot open span areas $A_s$, $A_s$. On the other hand, the keeper member 27 contains the elongated spring bridge 33 having the similarly widely spaced apart keeper legs 34, 34 defining the keeper slot 35 therebetween. Thus, the base slots 32, 32 displaceably receive the keeper legs 34, 34 in spaced apart relation thereto while the keeper slot 35 displaceably receives the central leg 30 in spaced apart relation thereto.

In this way, the cable 28 is interwoven through the various seats or apertures in the opposing legs in the same manner as the embodiment of FIG. 1. The slot open span areas $A_s$, $A_s$ in relation to the widths of the keeper legs 34, 34 and the keeper slot 35 also define interspaces representing the conductor open span areas $A_c$, $A_c$. These open span areas permit the cable 28 to be interwoven through the opposing legs in offset registry of the leg apertures or seats to prevent the cable from being removed by an axial force pulling the cable in the direction of arrow P against the operative force of keeper screw 36.

The open wall faces in the various slots increase the area of cooling which may be provided, i.e. beyond that of the sliding positive contact embodiment discussed in connection with FIGS. 1 to 3, and the interspaces between the legs and concomitant cable open span areas $A_c$, $A_c$ effectively permit the cable to be retained under interwoven crimping or bending deformation against an axial force exerted on such cable.

Optional mounting means 37 and/or 38, shown in phantom, may be provided in the case of a dead end connection arrangement and/or to mount the assembly on a support surface. The enlarged guide portions 39, 39 also shown in phantom, are an additional optional feature which may be provided on the outer ends of the two keeper legs for more stable guiding contact with the corresponding adjacent base legs during relative displacement of the clamping parts with respect to each other and when in clamping disposition.

The bending and weaving achieved by the simple and uncomplicated construction of the assembly shown in FIG. 4 avoids the need for employing shaped fittings in the seats of the clamp parts or otherwise providing for deformation imparting action on the cable. Any bending or weaving of the conductor in accordance with the embodiment of FIG. 4 takes place after the cable has been inserted through the apertures or seats of the respective legs and the keeper screw has been placed under compression load, with the bending or weaving of the cable, i.e. the crimping thereof, being due to the opposing spring tension forces of the clamping parts on the cable. The degree of bending is clearly dependent upon the dimension $A_c$ since this determines the portion of the cable which may be deformed or crimped, i.e. in between the respective interdigitately registered legs.

FIGS. 5 and 6 show an embodiment similar to that in FIGS. 1 to 3 in which the assembly 40 includes the base spring member 41 and the keeper spring member 42 having the cable 43 interconnecting the central screw abutting leg 44 and the base outer legs 45, 45 with the keeper legs 48, 48. The base member 41 contains the appropriate base outer slots 46, 46 in which the keeper legs 48, 48 extend to provide a captive assembly. For this purpose, outwardly extending keeper leg projections 49, 49 having corresponding contact surfaces operatively facing the keeper member are disposed at the distal ends of the keeper legs for coacting with the outwardly extending slot recesses 50, 50 in the base outer slots 46, 46. The base slot recesses 50, 50 also have corresponding contact surfaces which operatively face the base member for opposing abutment with the keeper contact surfaces during such coacting. The slot recesses 50, 50 captively receive the keeper projections 49, 49 (see FIG. 6) and limit the movement apart of the two members when the keeper screw 51 in spring bridge 47 is rotated in the usual manner and permit mechanical and electrical interface contact therebetween at the abutting contact surfaces.

Optional mounting means 52 and/or 53, shown in phantom, may be provided for connecting the assembly via either the base member 41 or the keeper member 42, as the case may be, on a support. If desired, both mounting means 52 and 53, as is true also of mounting means 37 and 38 of FIG. 4, may be used for enhanced mounting versatility of the assembly, e.g. on a selectively adjustable support (not shown).

An optional shoulder 53a, shown in phantom, may be provided for coaction with mounting means 53 against optionally extended base outer legs 45, 45, also shown in phantom, to limit inwardly the extent to which the keeper member 42 may be displaceably received within the base outer slots 46, 46 of the base member 41.

The use of the captive assembly projections 49, 49 and slot recesses 50, 50 may be employed as an initial measure for maintaining the co-acting parts together before reaching their end point of use. With the use of the optional mounting means 53 and shoulder 53a to limit relative movement of the members toward one another no damage to the projections 49, 49 will occur. The assembly may even be temporarily secured with a strap of the like to prevent disassembly of the parts in transport.

Advantageously, in the embodiment shown in FIGS. 5 and 6, the base and keeper members may be extruded in the form shown, i.e. already in captive assembly, or these parts may be separately fashioned and then inserted as a captive assembly by sliding the parts longitudinally into each other.

By selective dimensioning of the slot recesses 50, 50, the displacement of the parts toward and away from one another can be appropriately limited. On the other hand, by fashioning the keeper projections 49, 49 as small and thin flanges, they may serve as temporary means for captively retaining the assembly together such that, at the end point of use, the projections will shear off against the corresponding slot recesses 50, 50 upon moving the two members apart under the urging force of the compression loaded keeper screw 51.

Because of the close disposition of the facing walls of the legs of the two members, similar substantially positive sliding contact between the keeper legs and base outer slots and between the base central leg and the keeper slot may be provided. This is determined by selectively sizing and shaping the base and keeper legs and slots.

FIG. 7 shows a modified embodiment in which the assembly 54 contains the base spring member 55 and the keeper spring member 56 connecting the cable 57 thereat. The central screw abutting leg extending outwardly from yoke 58 is in the form of a bifurcated leg having the portions 59, 59 extending upwardly toward the keeper screw 65 with the forwardly or medially open central leg slot 60 therebetween. Otherwise, base member 55 contains in the same way as previously described the base outer legs 61, 61 and the base outer slots 62, 62 which operatively receive thereat the keeper legs 64, 64 extending from the keeper bridge 63.

In this embodiment, the pair of laterally extending seating shoulders 66, 66 is provided optionally on the keeper bridge 63 correspondingly adjacent the medial portions, i.e., outwardly of, the keeper legs 64, 64 therebetween and facing the distal portions or free ends of the corresponding base outer legs 61, 61 to limit the inward movement of the parts toward one another and to seat the distal portions of the corresponding base outer legs thereagainst when the members are moved to their inwardmost limited disposition, e.g., for storage.

By reason of the central slot 60 in the bifurcated central leg 59, 59, the assembly will effect even more pronounced spring bending along the yoke 58, and provide additional cooling surfaces at slot 60 and lateral contact edges on the respective seats of the bifurcated leg for compressively embracing the cable. This constructional embodiment lends itself very well to manufacture by extrusion. It will be realized that the central slot 60, i.e., a forward or medial leg slot which faces the keeper member 56, is selectively sized and shaped with respect to the contact portion of the keeper screw 65 to permit substantially the required urging contact of the screw with the bifurcated leg 59, 59.

FIG. 8 shows a multi-lateral tension spring assembly having a series of multi-functional spring actions beyond those normally attendant the constructions of the embodiments previously described. The assembly 67 is provided with a base spring member 68 more or less in a form of an upstanding W-shaped member, and the keeper spring member 69 more or less in the form of a downwardly pointed U-shaped member, interconnecting the cable 70 extending through the seats or apertures thereof. The base outer legs 73, 73 laterally outwardly diverge toward the keeper member 69 and form corresponding substantially laterally outwardly diverging base outer slots 74, 74 with the base central screw abutting leg 72, the legs 72 and 73, 73 being laterally interconnected at their medial end portions via the spring yoke 71. The keeper legs 76, 76 correspondingly laterally outwardly diverge toward the base member 68 and form a corresponding laterally outwardly diverging keeper slot 77 therebetween. Keeper legs 76, 76 are appropriately interconnected at their medial end portions to the keeper bridge 75.

By reason of the laterally outward diverging disposition of the base outer legs 73, 73 with respect to the spring yoke 71 and the laterally outward diverging disposition of the keeper legs 76, 76 with respect to the keeper bridge 75, corresponding spring apexes are formed between the medial portions of the legs and the spring yoke or keeper bridge, as the case may be. The configuration and construction of these clamping parts will permit multiple tension spring action to occur at the corresponding apex between each base outer leg and the base yoke and between each keeper leg and the keeper bridge as well as across the base yoke and across the keeper bridge when the base and keeper members are urged away from each other by the keeper screw 78 while the opposed base and keeper seats, provided in the same manner as in the foregoing embodiments, operatively engage the cable 70 inserted thereacross to interconnect the members.

As may be noted from the designations I to VI, a multiple number of springs are provided in the opposed clamping member assembly for multi-functional tension spring urgence against the cable under the force of the compression loaded keeper screw 78. The spring I and II correspond to the similar springs in the keeper bridge and spring yoke of the embodiment of FIG. 1, while the springs III and IV correspond to the seat springs III and IV in the embodiment of FIG. 2.

In addition to the springs I to IV essentially found in the assembly in accordance with all of the embodiments of the invention, in the case of the embodiments of FIG. 8, the further apex springs V, V at the corresponding apexes between the keeper legs 76, 76 and the keeper bridge 75 are provided as well as the corresponding apex springs VI, VI at the corresponding apexes between the base outer legs 73, 73 and the base spring yoke 71. This multiple spring system will more completely insure substantially constant positive tension contact between the two members and the cable interposed therebetween especially in the case of pronounced temperature changes and concomitant expansion and contraction of either or both of the members and/or of the cable. The keeper screw 78 as well as the base and keeper legs and slots can be selectively sized and shaped to permit an arrangement similar to that in FIG. 4, whereby to provide a clamping or bending deformation of the cable subject to the spring action of springs V and VI, i.e. under the resultant overall spring forces of springs I to VI generally tending to urge opposed portions of the girth of the cable in opposite directions, i.e. diametrically opposite directions.

The line contact of the appropriate edges of the seats of the outwardly diverging legs of the members will also enhance the compressive force of the seats against the cable to rupture surface oxidation layers and/or a peripheral insulation layer on the cable in accordance with the concept hereinbefore described (cf. the embodiment of FIGS. 1 to 3).

In FIG. 9, an alternate form of bifurcated leg base spring member assembly 79 is shown including the bifurcated base spring member 80 and the keeper spring member 81 having the cable 82 clampingly interconnected therebetween. The base spring member 80 includes the central yoke leg 83 in the form of a bifurcated leg having a corresponding rearwardly facing or distal central leg slot, i.e. facing the rear portion of the base member remote from the keeper member. The bifurcated leg 83 is provided with a screw abutting contact portion limiting the inner end of the distal leg slot 84 and facing the keeper screw 90 to permit urging contact of the screw therewith. The base spring member 80 includes the base outer legs 85, 85 laterally interconnected with the central yoke leg 83, so as to provide the outer base slots 86, 86 therebetween. The keeper spring member 81 is provided with the keeper bridge 87 laterally interconnecting the keeper legs 88, 88 to define therebetween the keeper slot 89. The keeper screw 90 is mounted in the keeper bridge 87 and extends into the keeper slot 89 for urging contact, as aforesaid, with the central yoke leg 83 at the screw abutting contact portion thereof. In this case also, the bifurcated central leg will permit even more pronounced spring bending, cooling and compressive seat cable contact via the central yoke leg portion than would otherwise be the case.

Keeper shoulders 91, 91 are optionally provided laterally outwardly of the medial portions of the keeper legs 88, 88 for seating engagement with the distal or free end portions of the base outer legs 85, 85 to aid seating the members in abutting contact with one another, for example, when stored as in the case of the shoulder embodiments of FIGS. 5 and 7.

The base spring member 80 of FIG. 9 may be advantageously provided in extruded form and the same is true of the keeper spring member 81. In fact, the base spring member 80 may be fashioned in the form of a laterally extending undulating flat spring wall of substantially rounded apex W-shaped composite configuration in which the outer ends thereof define the corresponding base outer legs 85, 85, the central apex thereof defines the bifurcated base central yoke leg 83, the double open portions at the upper end thereof adjacent the keeper member define the base outer slots 86, 86, and the single open portion at the lower end thereof remote from the keeper member defines the distal leg slot 84.

FIG. 10 shows an elbow connector assembly 92 for maintaining mechanical and/or electrical connection between two separate cables, optionally with the corresponding clamping parts selectively sized and shaped to prevent dislodgement of the particular cable by an axial pulling force in the manner accomplished with the construction of FIG. 4 as described above. In the embodiment of FIG. 10, in effect, one of the members is interconnected with at least one additional connector means for a corresponding additional cable.

In particular, the additional connector means is an additional tension connector assembly of the same type. Preferably, the two members of the same type which are interconnected are the base members, although as the artisan will appreciate, the two interconnected members could instead be a pair of keeper members, while the corresponding base members could be separate from one another. In either case, appropriate positive clamping contact connection of each cable with each set of clamping parts will occur.

Specifically, the assembly 92 includes the base spring members 93 and 93a interconnected at the interconnection 94 and arranged at an angle with respect to each other to permit corresponding angular mounting thereby of two cables 96 and 96a arranged in corresponding angular disposition. The base spring members 93 and 93a are provided with the appropriate coacting keeper spring members 95 and 95a for clamping contact of the respective cables via the appropriate keeper screws in the usual manner.

FIGS. 11 and 12 show a pair of interconnected assemblies similar to the composite embodiment of FIG. 10 but in this case in the form of an end to end splice for mechanical and/or electrical interconnection of a pair of cables disposed in end to end disposition. Specifically, end to end assembly 97 is provided with the base spring members 98 and 98a interconnected at the interconnection 99 and provided with the appropriate keeper spring members 100 and 100a for connecting cables 101 and 101a. Of course, in the same way as in the arrangement of FIG. 10, the two keeper members can be interconnected and the base members provided as separate members, with the same constant positive interconnection of the two cables being achieved thereby. This embodiment provides in effect a pair of assemblies of the same type arranged in lateral side by side disposition to permit corresponding end to end mounting thereby of two cables arranged in corresponding end to end disposition.

Any appropriate angular variation between the disposition of the assemblies and cables shown in FIGS. 11 and 12 and that shown in FIG. 10 can be undertaken yet the overall purposes of the present invention, e.g., mechanical and electrical interconnection, will still be achieved.

FIG. 13 shows a T-tap tube connector arrangement in which the T-assembly 102 is provided. Assembly 102 includes the connector means of the invention in the form of the base spring member 103 and the keeper spring member 104 having the cable 105 operatively interposed therebetween, as well as an additional connector means in the form of the embracing arcuate surface clamp 107 for the hollow tubular cable 108, e.g. a continuous run cable, interconnected with the base member 103 at the interconnection 106. Again, by reason of the purposes of the constructional arrangement provided, the surface clamp 107 can be alternately connected with the keeper member 104.

FIGS. 14 and 15 concern a T-tap continuous run stranded cable connector assembly. Tap assembly 109 includes the connector means of the invention in the form of the base spring member 110 and the keeper spring member 111 having the cable 112 operatively interposed therebetween and having the free end of the cable arranged in the base recess or seat 110a provided expediently in one of the base legs thereof. An additional connector means in the form of the multiple line compressive clamp 113 for a continuous run of cable is also provided, for example, in a form integral with the base leg carrying the recess or seat 110a so as to achieve the T-tap connection between the instant assembly-connected cable 112 and the clamp-connected continuous run cable 119. The multiple line contact clamp 113 is a compressive clamp including the center leg 114 and the pair of spaced apart outer legs 115 and 115a. Leg slots 116 and 116a are defined by the three legs of clamp 113. The center leg 114 of clamp 113 is provided with the upwardly or outwardly facing concavely arcuate seat 117 while the outer legs 115 and 115a of clamp 113 are provided with the corresponding upwardly or outwardly facing concavely arcuate seats 118 and 118a. Thus, the opposing keeper arch 120 having the downwardly or inwardly facing concavely arcuate seats 121 and 121a in the respective legs of such keeper arch coact with the seats 117, 118 and 118a to engage compressively the continuous run main cable 119 under the compression force of the pair of keeper screw bolts 122 and 122a (see FIG. 15). It will be appreciated that in this embodiment, the continuous run of the main cable is connected via a multiple line or surface contact compressive clamp whereas the tapping cable 112 is connected via a tension connector assembly 110 of the type indigenous to the present invention.

Naturally, in the same way as discussed above, the compressive clamp 113 can be connected with the keeper member 111 rather than the base member 110 by appropriately selecting the dimensions and orientation of the coacting parts.

FIGS. 16 and 17 show an additional form of T-tap connector which may be used, for example, as a bar or strap T-tap connector. The assembly 123 includes the connector means of the invention in the form of the base spring member 125 and the keeper spring member 125 operatively interconnecting the cable 126 therebetween. An additional connector means in the form of the bar clamp or planar surface clamp 127 is interconnected to the underside of the base member 124 and contains the captive clamp screw bolts 128 for engaging the keeper plate 129 to clamp therebetween an appropriate cable, here shown in the form of a connector bar 130 of rectangular cross section in a complementally shaped slot 131. It will be realized that the bar 130 may assume any desired configuration and be in the form of a flexible strap rather than a stiff bar, any such configuration being readily accommodated by the complemental slot 131 and the arrangement of the other parts in the composite assembly.

A plurality of sets of base seat apertures 132 may be optionally provided in tandem at longitudinally spaced apart intervals along the length of the base spring member 125, as well as a corresponding number of keeper spring members 125 (one being shown) having appropriate keeper seat apertures 133 alignable with a given set of the base seat apertures 132 for engaging a given cable 126.

This arrangement permits a number of separate cables of selective diameters to be interconnected mechanically and/or electrically with the bar or strap via the T-tap arrangement shown. In this case also, as noted above, the bar clamp 127 can be connected instead with a keeper member 125 by appropriate shaping and sizing of the coacting parts as may be necessary.

Thus, with regard to the various embodiments of FIGS. 10 to 17, the tension connector assembly basic to the invention may be interconnected in any relative orientation with one or more additional connector means for one or more correspondingly additional cables. While the interconnection is preferably undertaken with the corresponding base spring member of the basic tension connector of the invention, such connection may alternately be executed by way of a given keeper member, so long as the coacting parts are selectively sized and shaped to permit unhindered operative engagement therebetween to clamp the individual cable of the basic tension connector of the invention in a substantially positive manner under spring tension. It will be realized that where the second or additional connector means is interconnected with the keeper member rather than with the base member, a separate series of base members can advantageously be provided for coaction with a common keeper member at longitudinally spaced apart points therealong in the reverse manner from that shown in FIG. 17 and in the arrangements of FIGS. 18 to 20 hereinafter described. The second or additional connector means may be selected in any desired form depending upon the nature of the second or additional cable to be connected mechanically and/or electrically with the cable operatively interposed between the base and keeper members of the basic tension connector assembly of the invention.

As shown in FIG. 18, the base member may be provided of any suitable selective length X and constitutes preferably an extruded longitudinal base spring member, here in the form of an elongated bar 134. The extruded bar 134 includes a correspondingly elongated central screw abutting leg and a pair of correspondingly elongated outer legs extending away from the bar and arranged across the bar in substantially transversely spaced apart disposition to define interposed therebetween two corresponding elongated base outer slots. The elongated bar 134 is in effect the same type base member as shown in the embodiment of FIGS. 1 to 3 except that the longitudinal dimension X is generally of greater magnitude than the length L in the embodiment of FIGS. 1 to 3.

Hence, each set of base seats or seat apertures to be provided in the extruded bar 134 as desired may operatively receive thereacross an appropriate cable 136 (shown in phantom) for clamping engagement thereat with an appropriate keeper spring member 135 of the usual type.

The keeper spring members 135 may be similarly extruded so as to provide prefabricated form parts to permit convenient cutting of the elongated bar 134 to the appropriate length at the end point of use, preferably with selectively spaced apart tandem arranged sets of base seats or seat apertures predrilled therethrough, so that the appropriate number of keeper spring members 135 may be assembled therewith to accommodate the necessary number of cables to be connected by the composite assembly.

Advantageously, the length X of the bar 134 may be chosen to provide a maximum heat load cooling surface to dissipate any heat and thus minimize the tendency of the arrangement to expand and contract with changes in temperature.

In the usual case, a plurality of at least two tandem arranged sets of corresponding substantially aligned cable engaging base seats will be defined across the base central and outer legs at respective selective spaced intervals longitudinally therealong and facing the bar, to accommodate a corresponding plurality of tandem arranged keeper spring members 135 in opposing facing relation to the elongated bar 134 and correspondingly adjacent the respective sets of base seats.

Each such keeper member 135 will generally include a substantially transversely extending central spring bridge remote from the bar, a pair of keeper legs extending from the central bridge toward the bar in opposing adjacency to the base legs and defining a keeper slot substantially transversely therebetween, corresponding substantially aligned cable engaging keeper seats defined across the keeper legs and facing the keeper member, and an adjustable tension exerting keeper screw rotatably mounted in the central bridge for displacement into the keeper slot. Each of the keeper members will furthermore have the legs thereof correspondingly substantially transversely offset with respect to the base legs and displaceably received in the corresponding base slots and will also have the adjacent portion of the base central leg displaceably received in the keeper slot thereof for urging contact of the keeper screw thereof against such base central leg.

This will permit individual movement of each keeper member toward and away from the bar for corresponding overlapping alignment of the keeper seats thereof with the adjacent set of base seats in opposed relation thereat and for cooperative opposed seating engagement of such set of base seats and the corresponding keeper seats with a portion of the corresponding cable 136 insertable substantially transversely thereacross to interconnect thereby the legs of the bar with the legs of the keeper member. Such arrangement will also permit individual displacement of the corresponding keeper screw into urging contact with the portion of the base central leg, more specifically to engage the corresponding set of base seats against the portion of the girth of the cable which is remote from the bar and to engage the corresponding keeper seats against the opposed portion of the girth of the cable which is remote from the keeper member under the corresponding spring tension of the bar and such keeper member.

This relationship can be appreciated more fully from the more particular constructional details shown in the embodiment of FIGS. 19 to 20. Here, the base member in the form of an extruded longitudinal base spring member, i.e., an elongated bar 138, is provided with mounting means, in the form of the captive bolts 146 within the captive slots 144 in the underside of bar 138, to mount the connector assembly 137 on a connector bar or support surface 145 or the like. In a more complete arrangement than that shown in FIG. 18, a plurality of tandem arranged individual keeper members 139 is provided, each having an appropriate keeper screw 140 to urge the respective keeper member 139 away from the common or composite bar 138. In this manner, the various cables 141a to 141f of selectively differing sizes, i.e. diameters, may be accommodated in the base seats 142 shown as circular seat apertures of the same cross-section, as well as in the keeper seats 143 also shown as circular seat apertures of the same cross-section. By merely adjusting the disposition of the appropriate keeper screw 140, the portion of overlap of the aligned sets of tandem arranged base seats and keeper seats may be changed to assure clamping contact of the opposed seats with the adjacent portions of the cables utilizing the spring tension of the two opposed members to insure positive clamping contact of the assembly with each individual cable.

It will be realized that the seat apertures may be provided of selective size and shape so long as they are dimensioned to accommodate the connection of a given cable and so long as appropriate cable engaging seat portions are provided to achieve the operative contact connection of the parts.

An alternate composite multiple connector assembly is shown in the form of a pedestal terminal bar assembly in FIG. 21. The composite assembly 147 includes a bar assembly of the type contemplated in FIGS. 18 to 20 as well as a further bar assembly, i.e., a further longitudinal base spring member in the form of a further elongated bar of the same type interconnected in opposing mirror disposition to the first-mentioned elongated bar substantially along at least a part of their common medial portions which are remote from their corresponding distal portions at which the base outer slots and sets of base seats thereof are situated.

Specifically, the composite assembly 147 includes the base spring members 148 and 148a interconnected in opposing mirror disposition along the part 150 of their common medial portions, with the two base spring members being provided with appropriate tandem-arranged keeper spring members 149 and 149a, as the case may be, in opposing facing relation thereto.

To enhance the spring action along the yoke portions of the two base members, appropriate longitudinal separation grooves 150a, 150a may be provided as shown in phantom in FIG. 21. The sets of base seat apertures 151 and 151a coact respectively with the appropriate sets of keeper seat apertures (not shown) to interconnect the various individual cables 152 under the spring tension provided by the keeper screws.

In the same way as in the previous embodiments discussed, each keeper member has the legs thereof correspondingly substantially transversely offset with respect to the base legs and displaceably received in the corresponding base slots and also has the adjacent portion of the base central leg thereat displaceably received in the keeper slot thereof for urging contact of the appropriate keeper screw against the base central leg, i.e. to permit the individual movement of each keeper member and the individual displacement of the corresponding keeper screw so as to engage the corresponding opposed seats thereat against corresponding opposed portions of the girth of the individual cable 152 inserted substantially transversely thereacross under the corresponding spring tension of each bar 148 or 148a and each keeper spring member 149 or 149a, as the case may be.

FIGS. 22 and 23 show a similar terminal block assembly in which a plurality of base spring members 154 of the same type is substantially radially outwardly arranged in the form of a substantially circular composite assembly 153 having a corresponding plurality of opposed keeper spring members 155 of the same type operatively disposed at the respective base members in substantially radially inwardly facing relation thereto. In this way a plurality of individual cables 156 may be interconnected via the circular terminal block assembly.

Each base member 154 is provided with a base central screw abutting leg 159 and a pair of base outer legs 160, 160 correspondingly extending side by side substantially in axial direction. Corresponding aligned substantially radially inwardly open base seat slots or slot apertures including central leg slot aperture 162 and base outer leg slot apertures 163, 163, are defined substantially in axial direction through the respective base legs 159, 160 and 160. Interposed between the corresponding base outer legs 160, 160 and the base central leg 159 are the base outer slots 161, 161. The axially spaced apart legs 159, 160 and 160 defining the base outer slots 161, 161 therebetween are interconnected by a pair of radially opposed substantially parallel spring semi-yokes 158, 158a extending substantially in axial direction along the radially opposed medial portions of the base legs adjacent the radially inwardly open portions of the corresponding seat slots or apertures 162, 163 and 163 thereat. The opposed spring semi-yokes 158, 158a define in substantially radial direction the corresponding radially opposed wall surfaces 164, 164 of the inwardly open portions of the seat slots or apertures 162, 163 and 163.

Each base member 154 is radially interconnected with the next adjacent base member along at least a portion of their correspondingly adjacent spring semi-yokes at the interconnections 157 remote from the respective wall surfaces 164 and 164 of the inwardly open portions of the corresponding seat slots defined thereby. These interconnections 157 form a continuous axially extending web 165 which represents circumferentially a discontinuous annular element. Such discontinuous annular element or web 165 is in effect interconnected via the distal portions of the base member legs radially outwardly extending in opposed relation to the corresponding keeper members 155, only one of which is shown in FIG. 22.

In the usual way, each corresponding keeper member is provided with corresponding aligned seat apertures 166 defined substantially in axial direction through the respective keeper legs for overlapping alignment with the adjacent base member open seat slots or slot apertures 162, 163 and 163 thereat.

Optionally, the coacting covers 167, 168 may be provided as a drum cover assembly for the composite arrangement, the cover 168 having the necks 169 (only one being shown) over which the appropriate tube cover 170 for the particular cable 156 may be disposed for better sealing of the individual cable within the arrangement. Thus, the cable having the insulation 156a may be exposed in the vicinity of the clamping assembly for enhanced electrical as well as mechanical interconnection via a corresponding base member and keeper member thereat.

Alternate embodiments of the invention include those shown in FIGS. 24 to 26 in which a double screw assembly connection is provided, utilizing seat aperture hook configurations for the legs of the base and keeper members.

In FIGS. 24 and 25, the assembly 171 is shown which includes the base spring member 172 and the keeper spring member 173 having the cable 174 operatively interposed therebetween. Base member 172 includes the spring yoke 175 and the base outer hook legs 176, 176 carrying the base hook seats or slot apertures 177, 177. The keeper bridge 178 on the keeper member 173 interconnects the keeper hook legs 179, 179 containing the keeper hook seats or slot apertures 180, 180. These parts generally function in the same manner as the previously described embodiments except that a pair of keeper screws 181, 181 is provided to urge the base and keeper members apart under the inherent spring tension of the system. Keeper shoulders 182, 182 extend laterally from the keeper legs 179, 179 to permit the pair of keeper screws to abut against the distal or free end portions of the base outer hook legs 176, 176. The base central leg 183 in this embodiment is optional since the keeper screws abut against the base outer legs.

By reason of the disposition of a pair of keeper screws, appropriate tension spring moments occur in the direction of the arrows shown in FIG. 24 which still insure the positive tension contact of the two keeper members against the cable interposed therebetween.

Even though the two keeper screws may not always be ajdusted precisely to balance the forces acting on the pair of members at both lateral sides of the system, because of the nature of the hook seats provided, sufficient tension will still exist for the desired purposes.

The embodiment of FIG. 26 is of generally the same construction and arrangement as shown in FIGS. 24 and 25, with the parts 171a to 181a being the same as those shown in FIGS. 24 and 25, and with the base central leg 183a also being optional as in the case of base central leg 183. However, the disposition of the right keeper leg 179a as shown in FIG. 26 is different from that of the arrangement in FIGS. 24 and 25. Specifically, the right keeper leg 179a is arranged to the right of the adjacent base outer leg 176a, permitting a wider optional base central leg 183a. Also, only one shoulder 182a corresponding to shoulder 182 of the previous embodiment is necessary since in this embodiment the second keeper screw 181a extends from the keeper bridge 178a centrally of the corresponding keeper leg 179a at the right side of the construction shown. Similar bending moments are shown by the arrows in FIG. 26 in view of the tension spring action of the corresponding base spring yoke and keeper bridge under the force of the compression loaded keeper screws 181a, 181a.

The further embodiment shown in FIG. 27 differs from the embodiments shown in FIGS. 24 to 26 by the use of a single keeper screw 181b centrally disposed in the keeper bridge 178b which abuts against a base abutment span 182b rather than against a base central leg. Specifically, the assembly 171b includes the closed perimetric base spring member 172b and the keeper spring member 173b having the cable 174b interposed operatively therebetween. The spring yoke 175b interconnects the base outer legs 176b, 176b having the base hook seats or slot apertures 177b, 177b preferably in the same manner as shown in FIG. 25. The keeper bridge 178b is provided with the keeper legs 179b, 179b containing the similar keeper hook seats or seat apertures 180b, 180b. The single keeper screw 181b centrally disposed in keeper bridge 178b abuts against the base abutment span 182b which interconnects the distal ends of the base outer legs 176b, 176b, i.e. behind the keeper spring member 173b as viewed in the drawing.

The compression loaded keeper screw 181b acts to provide an opposite type of bending moment for the keeper bridge spring from that shown in the embodiments of FIGS. 24 to 26 but similar to that provided in the case of the other single keeper screw embodiments of FIGS. 1 to 23. However, the bending moment at the underside of the base member along the spring yoke 175b is similar to the bending moment in the case of the embodiments of FIGS. 24 to 26 in view of the transmission of the force of screw 181b via base abutment span 182b of the base outer legs 176b, 176b to the ends of the spring yoke 175b.

Other forms of tension spring action consonant with the various embodiments discussed hereinabove may be similarly provided. In every instance at least a pair of bilateral or opposing tension springs will exist in the system of the assembly in question to insure positive spring contact between the clamping parts and the cable therebetween dispite ambient temperature changes and temperature changes occasioned by the electrical factors acting on the cable.

In accordance with a preferred embodiment of the invenion, the tension connector assembly includes a base member having three outwardly directed side by side substantially aligned legs, a keeper member having two outwardly directed side by side substantially aligned legs in opposed relation to the legs of the base member and inserted interdigitately in displaceable registry therewith to permit relative movement of the base member and keeper member toward and away from each other, opposed cable engaging seat apertures of substantially circular cross-section defined respectively through each of the legs for cooperative opposed clamping engagement with a portion of a cable insertable therethrough to interconnect thereby the legs of the base member with the legs of the keeper member, and adjustable tension exerting means interposed operatively between the base member and keeper member for urging the base member and keeper member away from each other and in turn the opposed seat apertures in correspondingly opposed directions substantially transverse to the axis of the cable insertable therethrough for tension engagement against the correspondingly opposed portions of the girth of such cable adjacent thereto.

In accordance with a further preferred embodiment of the invention a tension connector base bar for a cable or the like may be provided which includes a longitudinal base spring member in the form of an elongated bar including a correspondingly elongated central screw abutting leg and a pair of correspondingly elongated outer legs extending away from the bar and arranged across the bar in substantially transversely spaced apart disposition to define interposed therebetween two correspondingly elongated base outer slots, and a plurality of at least two tandem arranged sets of corresponding substantially aligned cable engaging base seats defined across the base central and outer legs at respective selective spaced intervals longitudinally therealong and facing the bar. Preferably the bar is in the form of an elongated spring yoke remote from the base seats and substantially transversely interconnecting the medial portions of the corresponding base legs. In particular, the aligned base seats are corresponding base seat apertures of substantially circular cross-section defined substantially transversely through the corresponding base legs at the respective intervals longitudinally therealong.

With regard to the last-mentioned embodiment, advantageously, a corresponding plurality of tandem arranged keeper spring members is provided in opposed facing relation to the bar and correspondingly adjacent the respective sets of base seats, each keeper member including a substantially transversely extending central spring bridge remote from the bar, a pair of keeper legs extending from the central bridge toward the bar in opposing adjacency to the base legs and defining a keeper slot substantially transversely therebetween, corresponding substantially aligned cable engaging keeper seat apertures, preferably of substantially circular cross-section, defined substantially transversely through the keeper legs, and an adjustable tension exterting keeper screw rotatably mounted in the central bridge for displacement into the keeper slot.

In coacting relation, each keeper member will have the legs thereof correspondingly substantially transversely offset with respect to the base legs and displaceably received in the corresponding base slots as well as the adjacent portion of the base central leg displaceably received in the keeper slot thereof for urging contact of the keeper screw thereof against such base central leg.

This will permit unhindered individual movement of each keeper member toward and away from the bar, both for corresponding overlapping alignment of the keeper seat apertures thereof with the adjacent set of base seat apertures in opposed relation thereat and for cooperating opposed seating engagement of such set of base seat apertures and the corresponding keeper seat apertures with a portion of a cable insertable substantially transversely thereacross, to interconnect thereby the legs of the bar with the legs of such keeper member.

Hence, upon displacement of the corresponding keeper screw into urging contact with the portion of the base central leg thereat, the corresponding set of base seat apertures will engage against the portion of the girth of the cable which is remote from the bar and the corresponding keeper seat apertures will engage against the opposed portion of the girth of the cable which is remote from the keeper member, i.e., under the corresponding spring tension of the bar and keeper members.

Advantageously, all of the embodiments of the invention provide a constant clamping pressure on the cable under the tension urgence of the base and keeper members, in any spatial orientation of the assembly and regardless of changes in temperature and concomitant differences in rates of expansion and contraction of the members and cable. The basic double spring action of the base and keeper members along with the additional spring action at the area of the respective legs adjacent the cable engaging seats, and that in the case of the special angular construction of FIG. 8, in effect, follow the expansion and contraction of the parts and of the cable, because inherently the memory of the material of which the members are made, e.g. extruded metal parts, tends to seek the original shape and disposition thereof. Constant electrical and mechanical contact is thereby maintained throughout, dispite the considerable differences in diameter of the cables which can be connected according to the invention.

Sustained multifunctional tension spring action is possible, limited only by the number and configuration of the legs (cf. FIGS. 7 to 9), including the corresponding number of cable engaging seats. While generally more resiliency can be imparted to the system by providing bifurcated legs and/or configurations of the type shown in FIG. 8, the amount of spring action is fundamentally determined by the selective, essentially unrestricted, dimensions of the base and keeper members, e.g. dimensions $W_b$, $W_k$, $T_b$, $T_k$ and L of FIGS. 1 and 2.

Electrical and mechanical connection is enhanced by interface sliding contact disposition of the legs, yet in all cases, because of the constant clamping pressure, cables of considerably different individual diameters can be accommodated and even be mounted via a mechanical dead end connection. Electrical and mechanical connection in turn with a further cable can be readily provided in all embodiments by interconnection of the first base and keeper assembly with a further clamping assembly of the same or different type and in any relative orientation (cf. FIGS. 10 to 17 and 19 to 23), even where the individual cables differ considerably in the respective diameters.

Dissipation of heat, e.g. in the case of an electrical cable, is enhanced by providing an open interface between the parts, i.e. by using leg slots which are wider than the legs, and/or by providing more legs or bifurcated legs. Generally, the selected, essentially unrestricted, number and size of the legs and dimensions of the members, e.g. cutting the extruded parts to different lengths, will determine the cooling rate of the assembly (cf. the dimensions $E_k$ of FIG. 1, L of FIG. 2, $A_s$ of FIG. 4 and X of FIG. 18).

Wide flexibility in constructional features for all embodiments is possible according to the invention, since the size and shape of the various parts can be selected to provide the desired amount of spring force and/or the desired cooling rate, as well as optional features such as angular legs as in FIG. 8, interface sliding contact of the legs for enhanced electrical and mechanical connection (except perhaps in the case of FIG. 8), wide leg slots for enhanced cooling and/or for weaving or crimping of the cable to prevent axial dislodgement, captive interassembly of the parts and/or end guide portions on the legs (except perhaps in the case of FIG. 8), bifurcated legs with a spring yoke as in FIG. 7 or a reverse spring yoke as in FIG. 9 (except perhaps in one or the other instance in the case of FIGS. 16 to 17 and 20 to 22), keeper shoulders, mounting means for the assembly, and the like.

In essence, only two basic shapes need be considered, one for the base member and the other for the keeper member or members. This permits the use of simple extrusion manufacturing techniques for low cost production of these parts. Hence, an extruded bar can serve as the common base member for mounting a plurality of cables of considerably differing individual diameters, and the bar can be provided as a prefabricated part, e.g. with tandem sets of predrilled holes as the base seats, for cutting to the desired length and assembly at the end point of use.

The seats of course can be provided in all embodiments in any desired form having any selective cross-sectional shape, e.g. round holes, hooks, slot apertures, and the like, and the cables can similarly be of any construction, shape or form.

It will be appreciated that the instant specification and drawings are set forth by way of illustration and not limitation, and that various modifications and changes may be made without departing from the spirit and scope of the present invention which is to be limited only by the scope of the appended claims.

What is claimed is:

1. Tension connector assembly for cable and the like, which comprises a base spring member and a keeper spring member in opposed facing relation, each member having legs extending toward the other member and corresponding cable engaging seats defined across the legs of such member and facing such member, the opposing legs of the members being correspondingly offset to permit relative movement of the members toward and away from each other and corresponding at least partial overlapping alignment of the base seats and keeper seats in opposed facing relation for cooperative opposed seating engagement of the corresponding seats with a portion of a cable insertable thereacross to interconnect thereby the legs of the base member with the legs of the keeper member, and adjustable tension exerting means interposed operatively between the members under compression-loaded condition and in a plane substantially passing through the base seats and keeper seats to urge such members away from each other and in turn the opposed seats under the corresponding spring tension of the base and keeper members against the correspondingly opposed portions of the girth of the cable adjacent thereto, the spring tension of the base and keeper members being effective to maintain clamping pressure on a cable disposed in the seats of the members when changes in temperature and concomitant expansion and contraction of the cable and/or base and keeper members occur.

2. Tension connector assembly for cable and the like according to claim 1, which comprises a base spring member and a keeper spring member in opposed facing realtion, at least two legs extending from the base member toward the keeper member and having corresponding cable engaging seats defined thereacross and facing the base member, two legs extending from the keeper member toward the base member in opposing adjacency to the at least two base member legs and having corresponding cable engaging seats defined thereacross and facing the keeper member, the opposing legs of the base and keeper members being correspondingly offset to permit relative movement of the members toward and away from each other and corresponding overlapping alignment of the base seats and keeper seats in opposed facing relation for cooperative opposed seating engagement of the corresponding seats with a portion of a cable insertable thereacross to interconnect thereby the legs of the base member with the legs of the keeper member, and adjustable tension exerting means interposed operatively between the base and keeper members to urge the members away from each other and in turn to engage the base seats against the portion of the cable girth which is remote from the base member and to engage the keeper seats against the opposed portion of the cable girth which is remote from the keeper member under the corresponding spring tension of the base and keeper members.

3. Assembly according to claim 2 wherein the base member legs are in laterally spaced apart substantial alignment and the keeper member legs are in laterally spaced apart substantial alignment in laterally offset overlapping adjacency to the corresponding base member legs, wherein the base seats are substantially aligned across the base legs and the keeper seats are substantially aligned across the keeper legs, and wherein the adjustable tension exerting means are screw means operatively mounted in one of the members for urging contact against the other of the members.

4. Assembly according to claim 3 wherein the base member includes a central screw abutting leg and a pair of outer legs arranged to define with the central leg two corresponding base outer slots which displaceably receive the corresponding keeper legs, the keeper member includes a spring bridge remote from the base member and laterally interconnecting the two keeper legs to define therebetween a keeper slot which displaceably receives the base central leg, and the adjustable tension exerting means includes a keeper screw rotatably mounted in the spring bridge for displacement into urging contact with the base central leg.

5. Assembly according to claim 4 wherein the base and keeper seats are corresponding seat apertures of substantially circular cross-section defined laterally through the respective legs.

6. Assembly according to claim 4 wherein the base member includes a spring yoke remote from the keeper member and laterally interconnecting the base central leg and outer legs.

7. Assembly according to claim 6 wherein the base and keeper legs and slots are selectively sized and shaped to provide substantially positive sliding contact between the keeper legs and the base outer slots and between the base central leg and the keeper slot.

8. Assembly according to claim 6 wherein the base and keeper legs and slots are selectively sized and shaped to provide interspaces between the corresponding overlapping legs.

9. Assembly according to claim 8 wherien the outer ends of the two keeper legs are provided with enlarged guide portions for guiding contact with the corresponding adjacent base legs.

10. Assembly according to claim 6 wherein the keeper legs are provided with outwardly extending projections having corresponding contact surfaces operatively facing the keeper member, and the base outer slots are provided with corresponding outwardly extending recesses captively receiving the keeper projections and having corresponding contact surfaces operatively facing the base member for opposing abutment with the keeper contact surfaces, to limit the relative movement of the members away from each other and to permit interface contact therebetween at the abutting contact surfaces.

11. Assembly according to claim 6 wherein the base central leg is provided in the form of a bifurcated leg having a corresponding medial leg slot facing the keeper member, the medial leg slot being selectively sized and shaped with respect to the contact portion of the keeper screw to permit substantially urging contact of the screw with the bifurcated leg.

12. Assembly according to claim 6 wherein the base outer legs laterally outwardly diverge toward the keeper member and form corresponding substantially laterally outwardly diverging base outer slots with the base central leg, and the keeper legs correspondingly laterally outwardly diverge toward the base member and form a corresponding laterally outwardly diverging keeper slot therebetween, to permit multiple tension spring action at the corresponding apex between each base outer leg and the base yoke and between each keeper leg and the keeper bridge as well as across the base yoke and across the keeper bridge when the base and keeper members are urged away from each other by the keeper screw while the opposed base and keeper seats operatively engage a cable inserted threacross to interconnect the members.

13. Assembly according to claim 4 wherein the base central leg is provided in the form of a bifurcated leg having a corresponding distal leg slot facing the rear portion of the base member remote from the keeper member and a screw abutting contact portion limiting the inner end of the distal leg slot and facing the keeper screw to permit urging contact of the screw therewith.

14. Assembly according to claim 13 wherein the base member is in the form of a laterally extending undulating flat spring wall of substantially W-shaped composite configuration in which the outer ends thereof define the corresponding base outer legs, the central apex thereof defines the bifurcated base central leg, the double open portions at the upper end thereof define the base outer slots, and the single open portion at the lower end thereof defines the distal leg slot.

15. Assembly according to claim 4 wherein the keeper member is provided with a pair of laterally extending seating shoulders correspondingly adjacent the medial portions of the keeper legs therebetween and facing the distal portions of the corresponding base outer legs to limit the relative movement of the members toward each other and to seat the distal portions of the corresponding base outer legs thereagainst when the members are moved to their inwardmost limited disposition.

16. Assembly according to claim 4 wherein mounting means are provided on at least one of the members to mount the connector assembly on a support.

17. Assembly according to claim 4 wherein one of the members is interconnected with at least one additional connector means for a correspondingly additional cable.

18. Assembly according to claim 17 wherein the additional connector means is an additional tension connector assembly of the same type having the base member thereof interconnected with the first-mentioned base member and arranged at an angle to the first-mentioned tension connector assembly to permit corresponding angular mounting thereby of two cables arranged in corresponding angular disposition.

19. Assembly according to claim 17 wherein the additional connector means is an additional tension connector assembly of the same type having the base member thereof interconnected with the first-mentioned base member and arranged in lateral side by side disposition to the first-mentioned tension connector assembly to permit corresponding end to end mounting thereby of two cables arranged in corresponding end to end disposition.

20. Assembly according to claim 17 wherein the additional connector means is interconnected with the base member and is in the form of an embracing arcuate surface clamp for a tubular cable.

21. Assembly according to claim 17 wherein the additional connector means is interconnected with the base member and is in the form of a multiple line contact compressive clamp for a correspondingly additional cable.

22. Assembly according to claim 17 wherein the additional connector means is interconnected with the base member and is in the form of a planar surface clamp for a cable in the form of a connector bar.

23. Assembly according to claim 4 wherein the base member is a longitudinal base spring member in the form of an elongated bar including a correspondingly elongated central screw abutting leg and a pair of correspondingly elongated outer legs extending away from the bar and arranged across the bar in substantially transversely spaced apart disposition to define interposed therebetween two corresponding elongated base outer slots, and a plurality of at least two tandem arranged sets of corresponding substantially aligned cable engaging base seats defined across the base central and outer legs at respective selective spaced intervals longitudinally therealong and facing the bar, and wherein a corresponding plurality of tandem arranged keeper spring members is provided in opposing facing relation to the bar and correspondingly adjacent the respective sets of base seats, each keeper member including a substantially transversely extending central spring bridge remote from the bar, a pair of keeper legs extending from the central bridge toward the bar in opposing adjacency to the base legs and defining a keeper slot substantially transversely therebetween, corresponding substantially aligned cable engaging keeper seats defined across the keeper legs and facing the keeper member, and an adjustable tension exerting keeper screw rotatably mounted in the central bridge for displacement into the keeper slot, and each keeper member having the legs thereof correspondingly substantially transversely offset with respect to the base legs and displaceably received in the corresponding base slots and having the adjacent portion of the base central leg displaceably received in the keeper slot thereof for urging contact of the keeper screw thereof against such base central leg, to permit individual movement of each keeper member toward and away from the bar for corresponding overlapping alignment of the keeper seats thereof with the adjacent set of base seats in opposed relation thereat and for cooperative opposed seating engagement of such set of base seats and the corresponding keeper seats with a portion of a cable insertable substantially transversely thereacross to interconnect thereby the legs of the bar with the legs of such keeper member, and to permit individual displacement of the corresponding keeper screw into urging contact with the portion of the base central leg thereat to engage the corresponding set of base seats against the portion of the girth of the cable which is remote from the bar and to engage the corresponding keeper seats against the opposed portion of the girth of the cable which is remote from the keeper member under the corresponding spring tension of the bar and such keeper member.

24. Assembly according to claim 23 wherein the base member is provided with mounting means to mount the connector assembly on a connector bar.

25. Assembly according to claim 23 wherein a further longitudinal base spring member in the form of a further elongated bar of the same type is interconnected in opposing mirror disposition to the first-mentioned elongated bar substantially along at least a part of their common medial portions which are remote from their corresponding distal portions at which the base outer slots and sets of base seats thereof are situated, and a further corresponding plurality of tandem arranged further keeper spring members of the same type is provided in opposing facing relation to the further bar and correspondingly adjacent the respective sets of further base seats, each further keeper member having the legs thereof correspondingly substantially transversely offset with respect to the further base legs and displaceably received in the corresponding further base slots and having the adjacent portion of the further base central leg displaceably received in the keeper slot thereof for urging contact of the keeper screw thereof against such further base central leg, correspondingly to permit such individual movement of each further keeper member and such individual displacement of the corresponding further keeper screw to engage the corresponding opposed seats thereat against corresponding opposed portions of the girth of a cable insertable substantially transversely thereacross under the corresponding spring tension of the further bar and such further keeper member.

26. Assembly according to claim 4 wherein a plurality of base members of the same type is substantially radially outwardly arranged in the form of a substantially circular composite assembly and a corresponding plurality of opposed keeper members of the same type is operatively disposed at the respective base members in substantially radially inwardly facing relation thereto.

27. Assembly according to claim 26 wherein each base member is provided with a base central leg and a pair of base outer legs correspondingly extending side by side substantially in axial direction, corresponding aligned substantially radially inwardly open seat slots defined substantially in axial direction through the respective base legs, and a pair of radially opposed substantially parallel spring semi-yokes extending substantially in axial direction and interconnecting the corresponding base legs along the radially opposed medial portions thereof adjacent the radially inward open portions of the corresponding seat slots thereat, the opposed spring semi-yokes defining in substantially radial direction the corresponding radially opposed wall surfaces of the inward open portions of the seat slots, each corresponding keeper member is provided with corresponding aligned seat apertures defined substantially in axial direction through the respective keeper legs for overlapping alignment with the adjacent base member open seat slots thereat, and each base member is radially interconnected with the next adjacent base member along at least a portion of their correspondingly adjacent spring semi-yokes remote from the respective wall surfaces of the inward open portions of the corresponding seat slots defined thereby.

28. Tension connector assembly for cable and the like, which comprises a base spring member having three outwardly directed side by side substantially aligned legs, a keeper spring member having two outwardly directed side by side substantially aligned legs in opposed relation to the legs of the base member and inserted interdigitately in displaceable registry therewith to permit relative movement of the base member and keeper member toward and away from each other, opposed cable engaging seat apertures of substantially circular cross-section defined respectively through each of the legs for cooperative opposed clamping engagement with a portion of a cable insertable therethrough to interconnect thereby the legs of the base member with the legs of the keeper member, and adjustable tension exerting means interposed operatively between the base member and keeper member under compression-loaded condition and in plane substantially passing through the base seat apertures and the keeper seat apertures for urging the base member and keeper member away from each other and in turn the opposed seat apertures in correspondingly opposed directions substantially transverse to the axis of the cable insertable therethrough for tension engagement against the correspondingly opposed portions of the girth of such cable adjacent thereto under the corresponding spring tension of the base and keeper members, the spring tension of the base and keeper members being effective to maintain clamping pressure on a cable disposed in the seat apertures of the members when changes in temperature and concomitant expansion and contraction of the cable and/or base and keeper members occur.

* * * * *

UNITED STATES PATENT OFFICE
CERTIFICATE OF CORRECTION

Patent No. 3,829,825          Dated August 13, 1974

Inventor(s) Ronald G. Hawkins

It is certified that error appears in the above-identified patent and that said Letters Patent are hereby corrected as shown below:

Column 1, line 7, change "an" to -- and --;

line 15, change "keepers" to -- keeper --;

line 60, after "and/or" insert -- cable. --;

Column 5, line 5, change "4o" to -- 4 --;

line 14, change "urn" to -- turn --;

Column 7, line 16, change "dispite" to -- despite --;

Column 13, line 41, before "seating" insert -- in --;

Signed and Sealed this twenty-eight Day of October 1975

[SEAL]

Attest:

RUTH C. MASON
*Attesting Officer*

C. MARSHALL DANN
*Commissioner of Patents and Trademarks*